(12) United States Patent
Sakitani et al.

(10) Patent No.: US 7,968,229 B2
(45) Date of Patent: Jun. 28, 2011

(54) POSITIVE ELECTRODE FOR NON-AQUEOUS ELECTROLYTE BATTERY AND NON-AQUEOUS ELECTROLYTE BATTERY

(75) Inventors: Nobuhiro Sakitani, Moriguchi (JP); Naoki Imachi, Moriguchi (JP); Atsushi Kaizuka, Moriguchi (JP); Takeshi Niitani, Ichihara (JP); Masato Amaike, Ichihara (JP)

(73) Assignees: Sanyo Electric Co., Ltd., Osaka (JP); Nippon Soda Co., Ltd., Tokyo (JP)

( * ) Notice: Subject to any disclaimer, the term of this patent is extended or adjusted under 35 U.S.C. 154(b) by 126 days.

(21) Appl. No.: 12/285,006

(22) Filed: Sep. 26, 2008

(65) Prior Publication Data
US 2009/0246630 A1 Oct. 1, 2009

(30) Foreign Application Priority Data

Sep. 27, 2007 (JP) ................. 2007-252147
Jun. 11, 2008 (JP) ................. 2008-152784

(51) Int. Cl.
*H01M 4/60* (2006.01)
*C08F 118/02* (2006.01)
*C08L 31/02* (2006.01)
*C09J 167/06* (2006.01)

(52) U.S. Cl. ........ 429/212; 524/556; 525/223; 525/219; 526/319; 526/329.3

(58) Field of Classification Search .......... None
See application file for complete search history.

(56) References Cited

U.S. PATENT DOCUMENTS

| 7,645,830 | B2 * | 1/2010 | Niitani et al. ............ | 524/556 |
| 2008/0187825 | A1 * | 8/2008 | Kawabata et al. .......... | 429/144 |
| 2008/0214685 | A1 * | 9/2008 | Niitani et al. ............. | 521/27 |
| 2009/0118436 | A1 * | 5/2009 | Niitani .................... | 525/390 |

FOREIGN PATENT DOCUMENTS

| JP | 2001-143703 A |   | 5/2001 |
| JP | 2002-020479   | * | 1/2002 |
| JP | 2003-221254 A |   | 8/2003 |
| JP | 2007-048462 A |   | 2/2007 |
| JP | 2007-510267 A |   | 4/2007 |
| WO | 2005/045957 A1 |  | 5/2005 |

OTHER PUBLICATIONS

Liu et al. Shanghai Jiaotong Daxue Xuebao, 2004, 38(11), 1951-1953 (abstract).*
Jeffrey W. Leon et al. "Isophthalate Ester-Terminated Dendrimers: Versatile Nanoscopic Building Blocks with Readily Modifiable Surface Functionalities" J. Am. Chem. Soc. 118, pp. 8847-8859, 1996.

* cited by examiner

*Primary Examiner* — Melvin C Mayes
*Assistant Examiner* — Yun Qian
(74) *Attorney, Agent, or Firm* — Kubovcik & Kubovcik

(57) ABSTRACT

A positive electrode for a non-aqueous electrolyte battery includes a positive electrode active material layer containing at least a positive electrode active material and a binder and a coating layer containing a polymer provided on the positive electrode active material layer, wherein the polymer has a block chain A composed of a random copolymer containing a repeating unit (I) represented by formula (I), a repeating unit (II) represented by formula (II), and a block chain B containing a repeating unit (III) represented by formula (III)

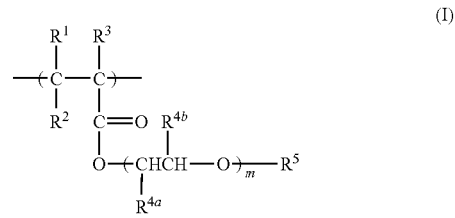

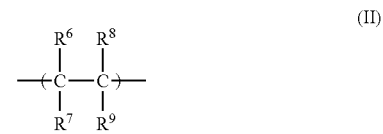

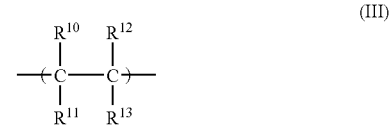

wherein $R^1$-$R^3$, $R^{4a}$, $R^{4b}$, $R^5$-$R^{13}$ are as defined herein.

24 Claims, 3 Drawing Sheets

LINEAR TYPE STRUCTURE

STAR TYPE STRUCTURE

LINEAR TYPE STRUCTURE

STAR TYPE STRUCTURE

POSITIVE ELECTRODE FOR NON-AQUEOUS ELECTROLYTE BATTERY AND NON-AQUEOUS ELECTROLYTE BATTERY

BACKGROUND OF THE INVENTION

1. Field of the Invention

The present invention relates to a positive electrode for non-aqueous electrolyte battery such as a lithium ion secondary battery and to a non-aqueous electrolyte battery using the same.

2. Description of the Related Art

In view of characteristics of small size and light weight, a lithium ion battery is widely diffused as a drive power source of potable instruments. In recent years, its development for applications including not only power tools and assisted bicycles but HEV is also expected. Like this, properties required for the lithium ion battery are being divided into two opposites of high capacity and high output, and in all of the applications, the amount of heat generated in the inside of the battery increases steadily. In the lithium ion battery which is especially low in thermal stability as compared with other secondary batteries, the development of an elemental technology enabling the battery to make both battery performance and reliability compatible with each other under a high-temperature condition is a pressing need. In particular, in the high performance of recent years, in order to bring out the performance of a material to the limit, how to control a chemical reaction occurring other than insertion and extraction of an Li ion is an important factor as compared with the related-art development of elemental technology.

Concretely, there are damage due to heat generated at high-rate charge and discharge and damage under high-temperature charge storage. In particular, how to control a side reaction (oxidation reaction) between an electrolytic liquid and a positive electrode active material in the vicinity of a positive electrode in the charged state is important. A positive electrode active material such as lithium cobalt oxide is instable with respect to its crystal structure in the charged state, and a possibility that it reacts with an electrolytic liquid, etc. to cause disintegration of the crystal structure becomes high. Also, the electrolytic liquid is decomposed coupled with its high positive electrode oxidation action/catalytic action, and the battery performance is largely lowered by clogging of a separator and an increase of deposits on the negative electrode surface to be caused due to elution of decomposed products derived from the electrolytic liquid or elemental components derived from the positive electrode material.

In the case where the battery in the charged state is stored in a high-temperature state, as a method for improving properties, there is made an attempt to improve high-temperature storage properties by coating the surface of a positive electrode active material particle with an inorganic material, thereby directly suppressing a reaction between of the positive electrode active material and an electrolytic liquid (see JP-A-2001-143703 and JP-A-2003-221234). Also, there is made an attempt to improve high-temperature storage properties by coating the surface of a positive electrode with a conductive polymer, thereby lowering a reaction with an electrolytic liquid (see JP-T-2007-510267).

However, in the foregoing related-art technologies, coating of the surface of a positive electrode active material with an inorganic material involved a problem that the coating layer slips down due to expansion and shrinkage of the positive electrode active material following charge and discharge so that an effect for suppressing the reaction with an electrolytic liquid is lowered. Also, there were involved problems that it is difficult to form a coating layer uniformly and thinly and that a lowering of the charge-discharge performance is caused.

Also, coating of the surface of a positive electrode active material particle or the positive electrode surface with a polymer are favorable in view of points that the organic material is rich in flexibility and able to follow expansion and shrinkage of the active material and that a thin film is easily formed. However, there is involved a problem that in a battery of a total gel type, the charge-discharge performance is lowered due to a lowering of ionic conductivity. Also, in case of a locally partial gel, there is involved a problem that dissolution into the electrolytic liquid existing in a large amount within the battery so that the improvement effect is weakened with a lapse of time. These problems can be treated to some extent by controlling the molecular weight. To increase the molecular weight is not preferable in view of a manufacturing step because dissolution of the polymer component in a solvent is noticeably lowered, and handling properties are lowered, too. Also, when the molecular weight is too low, the foregoing problems become distinct, and furthermore, decomposition of the polymer per se is easy to occur, resulting in a new problem that the battery performance is deteriorated.

JP-A-2007-48462 discloses that a polymer to be used in the invention is used as a binder for preparing an electrode. However, any review on use of this polymer as an additive in a coating layer for coating the surface or an active material layer is not made therein.

SUMMARY OF THE INVENTION

An object of the invention is to provide a positive electrode for non-aqueous electrolyte battery with excellent high-temperature storage properties and a non-aqueous electrolyte battery using the same.

The positive electrode for non-aqueous electrolyte battery according to a first aspect of the invention is a positive electrode for non-aqueous electrolyte battery comprising a positive electrode active material layer containing at least a positive electrode active material and a binder and a coating layer containing a polymer provided on the positive electrode active material layer, wherein the polymer has a block chain A composed of a random copolymer containing a repeating unit (I) represented by the following formula (I) and a repeating unit (II) represented by the following formula (II) and a block chain B containing a repeating unit (III) represented by the following formula (III).

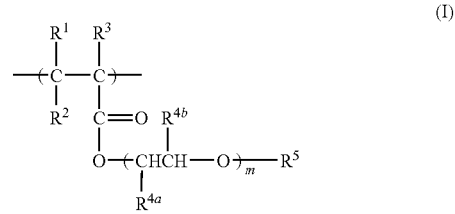

In the formula (I), $R^1$, $R^2$ and $R^3$ each independently represents a hydrogen atom or a hydrocarbon group having from 1 to 10 carbon atoms; $R^1$ and $R^3$ may be taken together to form a ring; $R^{4a}$ and $R^{4b}$ each independently represents a hydrogen atom or a methyl group; $R^5$ represents a hydrogen atom, a hydrocarbon group, an acyl group or a silyl group; m represents an integer of from 1 to 100; and when m is 2 or more, $R^{4a}$s and $R^{4b}$s may be the same or different, respectively.

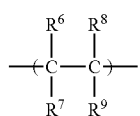

In the formula (II), $R^6$ and $R^8$ each independently represents a hydrogen atom or a hydrocarbon group having from 1 to 10 carbon atoms; $R^6$ and $R^8$ may be taken together to form a ring; $R^7$ represents a hydrogen atom, a hydrocarbon group having from 1 to 10 carbon atoms, a hydroxyl group, a hydrocarbon oxy group, a carboxyl group, an acid anhydride group, an amino group, an ester group, or an organic group having at least one functional group selected from the group consisting of a hydroxyl group, a carboxyl group, an epoxy group, an acid anhydride group and an amino group; and $R^9$ represents an organic group having at least one functional group selected from the group consisting of a hydroxyl group, a carboxyl group, an epoxy group, an acid anhydride group and an amino group.

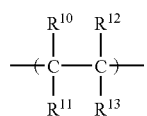

In the formula (III), $R^{10}$, $R^{11}$ and $R^{12}$ each independently represents a hydrogen atom or a hydrocarbon group having from 1 to 10 carbon atoms; and $R^{13}$ represents an aryl group or a heteroaryl group.

According to the first aspect of the invention, the coating layer containing the polymer is provided on the positive electrode active material layer, and the direct contact between the non-aqueous electrolyte and the positive electrode active material layer can be controlled by this coating layer. Therefore, it is possible to suppress oxidative decomposition of the non-aqueous electrolyte or catalytic decomposition of the non-aqueous electrolyte on the surface of the positive electrode active material and to enhance charge-discharge storage properties.

Also, since the coating layer is one containing a polymer, it is rich in flexibility, free from slipping and falling or separation due to expansion and shrinkage of the active material following charge and discharge and able to keep the effects of the invention for a long period of time.

In the first aspect of the invention, it is preferable that the coating layer has a coverage in the range of from 0.01 to 0.05 mg/cm². When the coverage of the coating layer is too small, there may be the case where the effect of the invention for enhancing high-temperature storage properties is not thoroughly obtained. Also, when the coverage of the coating layer is too large, there may be the case where charge-discharge cycle properties are lowered.

The positive electrode for non-aqueous electrolyte battery according to a second aspect of the invention is a positive electrode for non-aqueous electrolyte battery comprising a positive electrode active material layer containing at least a positive electrode active material, a binder and a polymer, wherein the content of the polymer in the positive electrode active material layer is in the range of from 0.01 to 0.5% by weight; and the polymer has a block chain A composed of a random copolymer containing a repeating unit (I) represented by the following formula (I) and a repeating unit (II) represented by the following formula (II) and a block chain B containing a repeating unit (III) represented by the following formula (III).

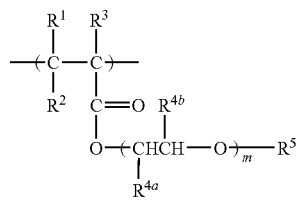

In the formula (I), $R^1$, $R^2$ and $R^3$ each independently represents a hydrogen atom or a hydrocarbon group having from 1 to 10 carbon atoms; $R^1$ and $R^3$ may be taken together to form a ring; $R^{4a}$ and $R^{4b}$ each independently represents a hydrogen atom or a methyl group; $R^5$ represents a hydrogen atom, a hydrocarbon group, an acyl group or a silyl group; m represents an integer of from 1 to 100; and when m is 2 or more, $R^{4a}$s and $R^{4b}$s may be the same or different, respectively.

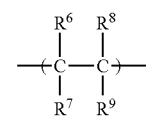

In the formula (II), $R^6$ and $R^8$ each independently represents a hydrogen atom or a hydrocarbon group having from 1 to 10 carbon atoms; $R^6$ and $R^8$ may be taken together to form a ring; $R^7$ represents a hydrogen atom, a hydrocarbon group having from 1 to 10 carbon atoms, a hydroxyl group, a hydrocarbon oxy group, a carboxyl group, an acid anhydride group, an amino group, an ester group, or an organic group having at least one functional group selected from the group consisting of a hydroxyl group, a carboxyl group, an epoxy group, an acid anhydride group and an amino group; and $R^9$ represents an organic group having at least one functional group selected from the group consisting of a hydroxyl group, a carboxyl group, an epoxy group, an acid anhydride group and an amino group.

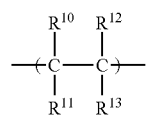

In the formula (III), $R^{10}$, $R^{11}$ and $R^{12}$ each independently represents a hydrogen atom or a hydrocarbon group having from 1 to 10 carbon atoms; and $R^{13}$ represents an aryl group or a heteroaryl group.

In a preferred embodiment according to the second aspect of the invention, an additive layer composed of the foregoing polymer is disposed in the surroundings of the binder for coating the positive electrode active material.

That is, the positive electrode for non-aqueous electrolyte battery according to a preferred embodiment according to the second aspect of the invention is a positive electrode for non-aqueous electrolyte battery comprising a positive electrode active material layer containing at least a positive electrode active material and a binder and an additive layer composed of a polymer and disposed in the surroundings of the binder for coating the positive electrode active material within the positive electrode active material layer, wherein the content of the additive layer in the positive electrode active material layer is in the range of from 0.01 to 0.5% by weight; and the polymer has a block chain A composed of a random copolymer containing a repeating unit (I) represented by the following formula (I) and a repeating unit (II) represented by the following formula (II) and a block chain B containing a repeating unit (III) represented by the following formula (III).

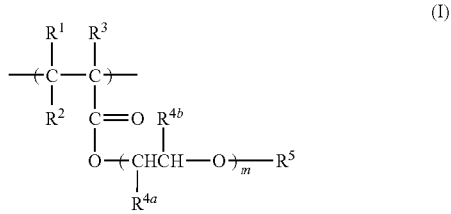
(I)

In the formula (I), $R^1$, $R^2$ and $R^3$ each independently represents a hydrogen atom or a hydrocarbon group having from 1 to 10 carbon atoms; $R^1$ and $R^3$ may be taken together to form a ring; $R^{4a}$ and $R^{4b}$ each independently represents a hydrogen atom or a methyl group; $R^5$ represents a hydrogen atom, a hydrocarbon group, an acyl group or a silyl group; m represents an integer of from 1 to 100; and when m is 2 or more, $R^{4a}$s and $R^{4b}$s may be the same or different, respectively.

(II)

In the formula (II), $R^6$ and $R^8$ each independently represents a hydrogen atom or a hydrocarbon group having from 1 to 10 carbon atoms; $R^6$ and $R^8$ may be taken together to form a ring; $R^7$ represents a hydrogen atom, a hydrocarbon group having from 1 to 10 carbon atoms, a hydroxyl group, a hydrocarbon oxy group, a carboxyl group, an acid anhydride group, an amino group, an ester group, or an organic group having at least one functional group selected from the group consisting of a hydroxyl group, a carboxyl group, an epoxy group, an acid anhydride group and an amino group; and $R^9$ represents an organic group having at least one functional group selected from the group consisting of a hydroxyl group, a carboxyl group, an epoxy group, an acid anhydride group and an amino group.

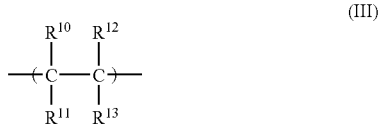
(III)

In the formula (III), $R^{10}$, $R^{11}$ and $R^{12}$ each independently represents a hydrogen atom or a hydrocarbon group having from 1 to 10 carbon atoms; and $R^{13}$ represents an aryl group or a heteroaryl group.

In a preferred embodiment of the second aspect of the invention, the additive layer composed of the foregoing polymer is disposed in the surroundings of the binder for coating the positive electrode active material. For that reason, it is possible to control the direct contact between the positive electrode active material and the non-aqueous electrolyte by this additive layer; and it is possible to suppress dissolution of elements from the positive electrode active material into the non-aqueous electrolyte, oxidative decomposition of the non-aqueous electrolyte or catalytic decomposition of the non-aqueous electrolyte on the surface of the positive electrode active material. Thus, it is possible to enhance high-temperature storage properties.

Also, in a preferred embodiment of the second aspect of the invention, since the additive layer exists in the surroundings of the binder for coating the positive electrode active material, the binder lies between the positive electrode active material and the additive layer. When the additive comes into direct contact with the positive electrode active material layer, the polymer of the additive layer is decomposed to generate a gas, thereby causing an increase in the thickness of the battery or the like. However, in the second aspect of the invention, such generation of a gas can be suppressed.

The positive electrode active material layer in a preferred embodiment of the second aspect of the invention can be, for example, formed by coating a slurry prepared by adding the foregoing polymer to a slurry containing the positive electrode active material and the binder.

The polymer which is used in the first aspect and second aspect of the invention is hereunder described.

A degree of polymerization of the repeating unit (I) in the polymer is preferably 5 or more. Also, a degree of polymerization of the repeating unit (II) is preferably 5 or more.

A proportion of the repeating unit (I) in the block chain A in the polymer is preferably in the range of from 90 to 99.9% by weight; and a proportion of the repeating unit (II) is preferably in the range of from 10 to 0.1% by weight.

A proportion of the total sum of the repeating units (I) and (II) relative to the total sum of the repeating units (I), (II) and (III) is preferably in the range of from 50 to 90% by weight; and a proportion of the repeating unit (III) is preferably in the range of from 50 to 10% by weight.

In the repeating unit (I), it is preferable that a repeating unit segment represented by the following formula (IV) accounts for from 65 to 85% by weight.

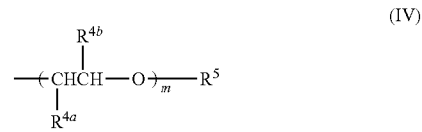
(IV)

In the formula (IV), $R^{4a}$ and $R^{4b}$ each independently represents a hydrogen atom or a methyl group.

The repeating unit (II) may be a repeating unit in which a (meth)acrylate having a hydroxyl group of the ester moiety is derived as a monomer.

The repeating unit (II) is contained in an amount preferably in the range of from 0.1 to 12.0% by weight, more preferably in the range of from 0.1 to 6.0% by weight, and most preferably in the range of from 0.1 to 1.5% by weight in the polymer.

The polymer may be a block polymer in which the block chain B, the block chain A and the block chain B are bound in this order. In that case, its number average molecular weight is preferably in the range of from 50,000 to 500,000.

The polymer may be a star polymer having a core part and an arm part composed of a polymer chain containing the block chain A and the block chain B. Furthermore, the polymer may be a star polymer having a core part having one or more aromatic rings and an arm part composed of a polymer chain in which the block chain B and the block chain A are aligned in this order from the core part. In that case, the block chain A may be formed upon being further extended from two or more functional groups of the end of the block chain B of the arm part. Examples of such a functional group include a functional group capable of being converted to a hydroxyl group-containing group and a functional group capable of being converted to an active halogen-containing group.

As the core part, those having a skeleton structure represented by the following formula (V) are exemplified.

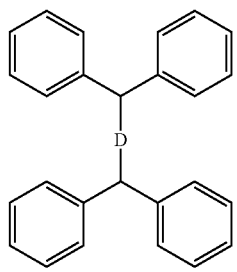

(V)

In the formula (V), D represents $(CH_2)_q$ or a p-phenylene group; and q represents an integer of from 0 to 3.

A number average molecular weight of the star polymer is preferably in the range of from 50,000 to 1,000,000.

A ratio (Mw/Mn) of a weight average molecular weight (Mw) to a number average molecular weight (Mn) of the star polymer is preferably in the range of from 1.001 to 2.50.

The polymer may be a crosslinked polymer obtained by allowing a block polymer in which the block chain B and the block chain A are aligned in this order to react with a crosslinking agent.

In that case, examples of the crosslinking agent include polyisocyanate compounds having two or more isocyanate groups in the molecule thereof.

The crosslinked polymer is preferably one obtained by allowing from 0.1 to 2 moles of the crosslinking agent to react per mole the repeating unit (II) in the block polymer.

The non-aqueous electrolyte battery of the invention comprises the foregoing positive electrode for non-aqueous electrolyte battery of the invention, a negative electrode and a non-aqueous electrolyte.

The positive electrode in the invention is not particularly limited so far as it is a positive electrode to be used in a non-aqueous electrolyte battery. Examples of positive electrode active materials include lithium cobalt oxide; lithium nickel composite oxides such as lithium nickel oxide; lithium transition metal composite oxides represented by, for example, $LiNi_xCo_yMn_zO_2$ (x+y+z=1); and olivine type phosphoric acid compounds.

From the viewpoint of suppressing a side reaction (oxidation reaction) between the charged positive electrode active material and the electrolytic liquid, it may be considered that even in case of using any active material, a certain effect is obtainable. In particular, in lithium cobalt oxide and lithium transition metal composite oxides having a layered structure, a charge voltage and a specific capacity are closely related to each other. Accordingly, in these compounds, while a high capacity can be realized at a high voltage to some extent, an oxidation action is high. Therefore, from the viewpoint of more exhibiting the effects of the invention, these compounds are a preferred positive electrode active material.

As the negative electrode in the invention, any negative electrode can be used without limitations so far as it can be used as a negative electrode for non-aqueous electrolyte battery. Examples of negative electrode active materials include carbon materials such as graphite and coke; tin oxide; metallic lithium; and metals capable of being alloyed with lithium, such as silicon.

The non-aqueous electrolyte in the invention is not particularly limited so far as it can be used for non-aqueous electrolyte batteries. Examples of lithium salts include $LiBF_4$, $LiPF_6$, $LiN(SO_2CF_3)_2$, $LiN(SO_2C_2F_5)_2$ and $LiPF_{6-x}(C_nF_{2n+1})_x$ (wherein 1<x<6, and n=1 or 2). These lithium salts can be used singly or in admixture of two or more kinds thereof. Though a concentration of such a lithium slat is not particularly limited, it is preferably from about 0.8 to 1.8 moles/liter.

As a solvent to be used for the non-aqueous electrolyte, carbonate based solvents such as ethylene carbonate (EC), propylene carbonate (PC), γ-butyrolactone (γ-BL), diethyl carbonate (DEC), ethylmethyl carbonate (EMC) and dimethyl carbonate (DMC) are preferably used. A mixed solvent of a cyclic carbonate and a linear carbonate is more preferably used.

The non-aqueous electrolyte in the invention may be an electrolytic liquid or may be a gel based polymer. Examples of polymer materials include solid electrolytes such as polyether based solid polymers, polycarbonate based solid polymers, polyacrylonitrile based solid polymers, oxetane based polymers, epoxy based polymers, and copolymers composed of two or more kinds of these polymers or crosslinked polymers.

Though the non-aqueous electrolyte battery of the invention may be a primary battery, it is preferably a non-aqueous electrolyte secondary battery.

In the first aspect of the invention, the coating layer composed of the foregoing polymer is provided on the positive electrode active substance layer. Also, in the preferred embodiment of the second aspect of the invention, the additive layer composed of the foregoing polymer is disposed in the surroundings of the binder for coating the positive electrode active material. According to such coating layer and additive layer, it is possible to control the direct contact between the non-aqueous electrolyte and the positive electrode active material. For that reason, it is possible to suppress dissolution of elements from the positive electrode active material to be caused due to instability of a structure thereof, oxidative decomposition of the non-aqueous electrolyte or catalytic decomposition of the non-aqueous electrolyte on the surface of the positive electrode active material.

Therefore, according to the first aspect and second aspect of the invention, it is possible to enhance high-temperature storage properties.

Also, in the invention, the coating layer or additive layer composed of a polymer is used, and such coating layer or additive layer is rich in flexibility and free from slipping and falling or separation and the like even by expansion and shrinkage of the active material following charge and discharge. Thus, it is possible to keep the foregoing effects of the invention for a long period of time.

DETAILED DESCRIPTION OF THE PREFERRED EMBODIMENTS

Figure 1:
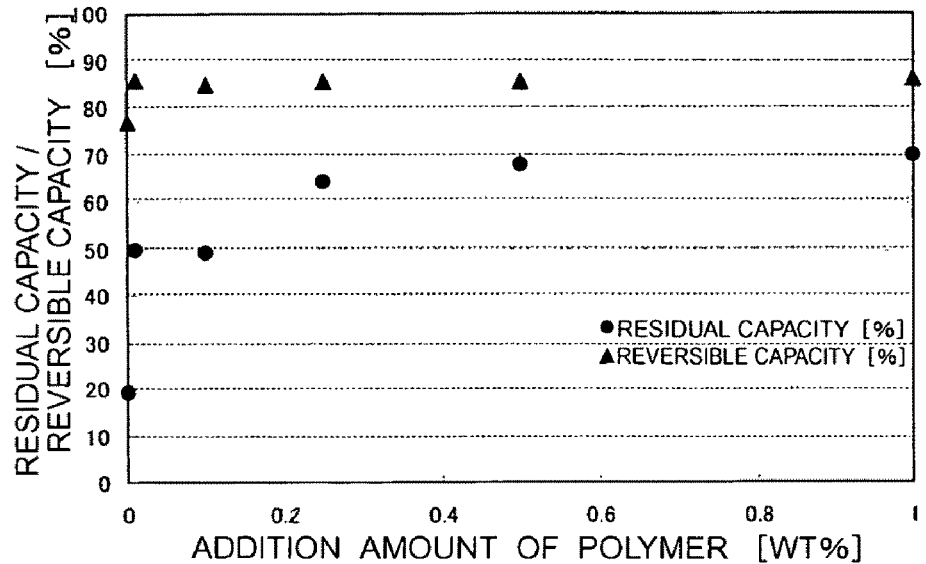
FIG. 1 is a graph showing the relationship between an addition amount of a polymer and a residual capacity and a reversible capacity.

The polymer of the invention comprises a block chain A composed of a random copolymer containing a repeating unit (I) represented by the foregoing formula (I) and a repeating unit (II) represented by the foregoing formula (II) and a block chain B containing a repeating unit (III) represented by the foregoing formula (III) in an alignment order of B and A.

The polymer in the invention is hereunder described in detail.

The polymer in the invention has the block chain A composed of a random copolymer containing the repeating unit (I) and the repeating unit (II) and the block chain B containing the repeating unit (III). The block chain A and the block chain B may be directly bound to each other or may be bound to each other via other constitutional unit such as a connecting group and a polymer chain. Examples of the connecting group include an oxygen atom and a low-molecular connecting group such as an alkylene group.

$R^1$ to $R^5$ and m in the repeating unit (I) are as follows.

$R^1$ to $R^3$ each independently represents a hydrogen atom; or a hydrocarbon group having from 1 to 10 carbon atoms, such as a methyl group, an ethyl group, an n-propyl group, an isopropyl group, an n-butyl group, a sec-butyl group, an isobutyl group, a t-butyl group, a phenyl group, a naphthyl group and a benzyl group.

$R^1$ and $R^3$ may be taken together to form a ring.

$R^{4a}$ and $R^{4b}$ each independently represents a hydrogen atom or a methyl group.

$R^5$ represents a hydrogen atom; a hydrocarbon group such as a methyl group, an ethyl group, an n-propyl group, an isopropyl group, an n-butyl group, a sec-butyl group, an isobutyl group, a t-butyl group, an n-hexyl group, a phenyl group, a substituted phenyl group and a naphthyl group; an acyl group such as a formyl group, an acetyl group, a propionyl group and a butyryl group; or a silyl group such as a trimethylsilyl group, a t-butyldimethylsilyl group and a dimethylphenylsilyl group.

The hydrocarbon group represented by $R^1$ to $R^5$ may have a substituent on an appropriate carbon atom. Specific examples of such a substituent include a halogen atom such as a fluorine atom, a chlorine atom and a bromine atom; a hydrocarbon group such as a methyl group, an ethyl group, an n-propyl group, a phenyl group, a naphthyl group and a benzyl group; an acyl group such as an acetyl group and a benzoyl group; a cyano group; a nitro group; a hydrocarbon oxy group such as a methoxy group and a phenoxy group; an alkylthio group such as a methylthio group; an alkylsulfinyl group such as a methylsulfinyl group; an alkylsulfonyl group such as a methylsulfonyl group; an optionally substituted amino group such as an amino group and a dimethylamino group; and an anilino group.

m represents an integer of from 1 to 100, and preferably an integer of from 2 to 50. The values of m in the respective repeating units may be the same or different.

When m is 2 or more, $R^{4a}$s and $R^{4b}$s may be the same or different, respectively.

A degree of polymerization of the repeating unit (I) varies with the value of m and is preferably 5 or more, and more preferably 10 or more.

Specific examples of monomers capable of giving the repeating unit (I) include 2-methoxyethyl (meth)acrylate, 2-ethoxyethyl (meth)acrylate, 2-methoxypropyl (meth)acrylate, 2-ethoxypropyl (meth)acrylate, methoxy polyethylene glycol (unit number of ethylene glycol: 2 to 100) (meth)acrylate, ethoxy polyethylene glycol (meth)acrylate, phenoxy polyethylene glycol (meth)acrylate, methoxy polypropylene glycol (unit number of propylene glycol: 2 to 100) (meth)acrylate, ethoxy polypropylene glycol (meth)acrylate, phenoxy polypropylene glycol (meth)acrylate, polyethylene glycol mono(meth)acrylate, 2-hydroxypropyl (meth)acrylate, polypropylene glycol mono(meth)acrylate, polyethylene glycol-polypropylene glycol mono(meth)acrylate, octoxy polyethylene glycol-polypropylene glycol mono (meth)acrylate, lauroxy polyethylene glycol mono(meth) acrylate, stearoxy polyethylene glycol mono(meth)acrylate, "BLEMMER PME Series" (monomers corresponding to those represented by the formula (I) wherein $R^1$ and $R^2$ are each a hydrogen atom; $R^3$ is a methyl group; and m is from 2 to 90; manufactured by NOF Corporation), acetyloxy polyethylene glycol (meth)acrylate, benzoyloxy polyethylene glycol (meth)acrylate, trimethylsilyloxy polyethylene glycol (meth)acrylate, t-butyldimethylsilyloxy polyethylene glycol (meth)acrylate, methoxy polyethylene glycol cyclohexene-1-carboxylate and methoxy polyethylene glycol cinnamate.

These compounds can be used singly or in combination of two or more kinds thereof.

$R^6$ to $R^9$ in the repeating unit (II) are as follows.

$R^6$ and $R^9$ each independently represents a hydrogen atom; or a hydrocarbon group having from 1 to 10 carbon atoms, such as a methyl group, an ethyl group, an n-propyl group, an isopropyl group, an n-butyl group, a sec-butyl group, an isobutyl group, a t-butyl group, a phenyl group, a naphthyl group and a benzyl group.

$R^6$ and $R^8$ may be taken together to form a ring.

$R^7$ represents a hydrogen atom; a hydrocarbon group having from 1 to 10 carbon atoms; a hydroxyl group; a hydrocarbon oxy group such a methoxy group, an ethoxy group and a phenoxy group; a carboxyl group; an acid anhydride group; an amino group; an ester group; or an organic group having at least one functional group selected from the group consisting of a hydroxyl group, a carboxyl group, an epoxy group, an acid anhydride group and an amino group.

$R^9$ represents an organic group having at least one functional group selected from the group consisting of a hydroxyl group, a carboxyl group, an epoxy group, an acid anhydride group and an amino group.

$R^6$ to $R^9$ may each have a substituent on an appropriate carbon atom. Specific examples of such a substituent include a halogen atom such as a fluorine atom, a chlorine atom and a bromine atom; a hydrocarbon group such as a methyl group, an ethyl group, an n-propyl group, a phenyl group, a naphthyl group and a benzyl group; an acyl group such as an acetyl group and a benzoyl group; a cyano group; a nitro group; a hydrocarbon oxy group such as a methoxy group and a phenoxy group; an alkylthio group such as a methylthio group; an alkylsulfinyl group such as a methylsulfinyl group; an alkylsulfonyl group such as a methylsulfonyl group; an optionally substituted amino group such as an amino group and a dimethylamino group; and an anilino group.

Specific examples of the monomer capable of giving the repeating unit (II) are given as follows.

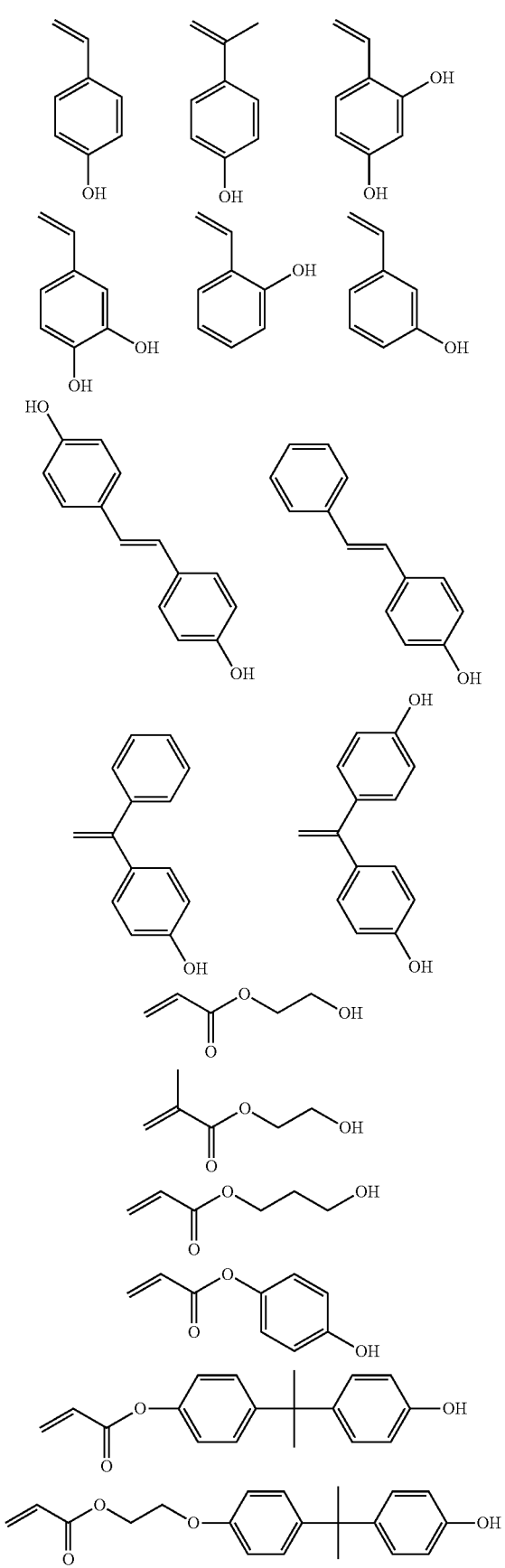
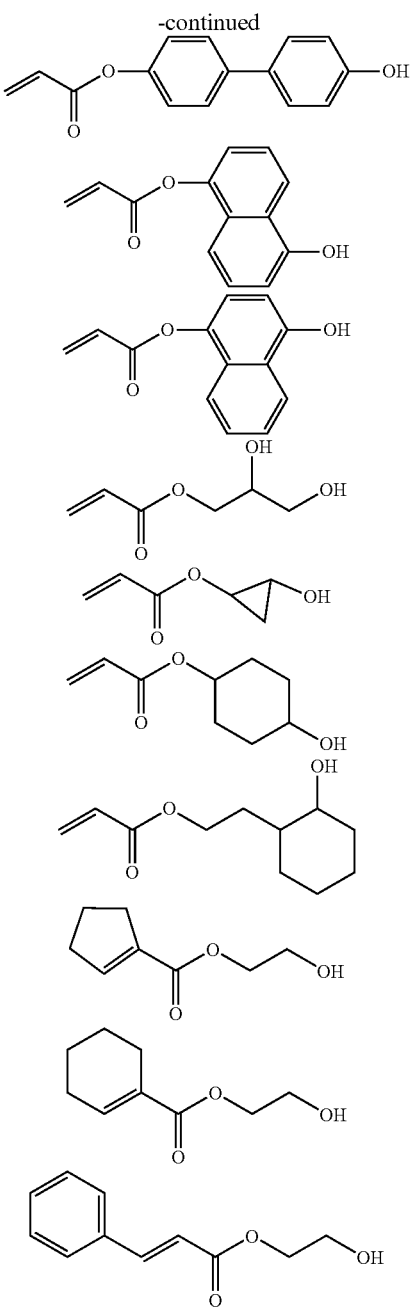

The foregoing compounds can be used singly or in combination of two or more kinds thereof.

As described previously, it is preferable that the block chain A is composed of the random copolymer containing the repeating unit (I) in a proportion of from 90 to 99.9% by weight and the repeating unit (II) in a proportion of from 10 to 0.1% by weight. The polymer having such a block chain A is excellent in thermal properties, physical properties and ionic conductivity.

As described previously, the degree of polymerization of the repeating unit (I) is preferably 5 or more, and more preferably in the range of from 5 to 300.

As described previously, the degree of polymerization of the repeating unit (II) is preferably 5 or more, and more preferably in the range of from 5 to 300.

$R^{10}$ to $R^{13}$ in the repeating unit (III) are as follows.

$R^{10}$ to $R^{12}$ each independently represents a hydrogen atom; or a hydrocarbon group having from 1 to 10 carbon atoms, such as a methyl group, an ethyl group, an n-propyl group, an isopropyl group, an n-butyl group, a sec-butyl group, an isobutyl group, a t-butyl group, a phenyl group, a naphthyl group and a benzyl group.

$R^{13}$ represents an aryl group such as a phenyl group, a naphthyl group and an anthracenyl group; or a heteroaryl group such as a 2-pyridyl group and a 4-pyridyl group.

Each of $R^{10}$ to $R^{13}$ may have a substituent on an appropriate carbon atom. Examples of such a substituent include groups the same as those exemplified above for the substituent in $R^6$ to $R^9$.

Specific examples of monomers capable of giving the repeating unit (III) include styrene, o-methylstyrene, p-methylstyrene, p-t-butylstyrene, o-methylstyrene, p-t-butoxystyrene, m-t-butoxystyrene, 2,4-dimethylstyrene, m-chlorostyrene, p-chlorostyrene, 1-vinylnaphthalene, 9-vinylanthracene, 2-vinylpyridine and 4-vinylpyridine. These compounds can be used singly or in combination of two or more kinds thereof.

Though the degree of polymerization of the repeating unit (III) is not particularly limited, in order to form a micro-phase separation structure, it is preferably 5 or more, and more preferably in the range of from 5 to 300.

The micro-phase separation structure of the polymer in the invention is hereunder described.

In the block chain A, the repeating unit (I) is a polymer segment having ionic conductivity, and the repeating unit (II) is a polymer segment having a crosslinking point between the polymers. The block chain B is a polymer segment containing the repeating unit (III) and having no ionic conductivity.

Examples of the polymer of the invention include a random block copolymer in which the block chain B and the block chain A are bound and aligned in this order and a random block copolymer in which the block chain B, the block chain A and the block chain B are bound and aligned in this order. In such a block copolymer, the micro-phase separation structure can be formed of the block chain A and the block chain B. That is, in a block polymer in which a micro domain composed of the block chain A and a micro domain composed of the block chain B exist and the repeating unit (I) and the repeating unit (II) each of which is a hydrophilic polymer segment and the repeating unit (III) which is a hydrophobic polymer segment are connected to each other, the segments which are hydrophilic and hydrophobic, respectively and mutually reciprocal are coagulated in a self-organizing manner to form a regular structure on a nano scale, namely a micro-phase separation structure.

When the micro-phase separation structure of a network type is contained in the film composed of the polymer in the invention, in particular, it is possible to improve high-temperature storage properties of a lithium secondary battery in the charged state and high reliability of a high-capacity battery.

In the polymer of the invention, a proportion of the total sum of the repeating units (I) and (II) relative to the total sum of the repeating units (I), (II) and (III) is preferably in the range of from 50 to 90% by weight; and a proportion of the repeating unit (III) is preferably in the range of from 50 to 10% by weight. By making the proportions of the repeating units (I), (II) and (III) fall within the foregoing ranges, the micro-phase separation structure is easily formed. Such a polymer is excellent in thermal properties, physical properties and ionic conductivity.

The polymer of the invention may contain, in addition to the repeating units (I), (II) and (III), a repeating unit which is different from these repeating units (I), (II) and (III) as a constitutional unit. Examples of monomers capable of giving such other repeating unit include (meth)acrylic esters such as methyl (meth)acrylate, ethyl (meth)acrylate, n-butyl (meth)acrylate, t-butyl (meth)acrylate, cyclohexyl (meth)acrylate, benzyl (meth)acrylate, isobornyl (meth)acrylate, dicyclopentenyl (meth)acrylate, 1-adamantyl (meth)acrylate, 2-methyl-2-adamantyl (meth)acrylate, 1-methyleneadamantyl (meth)acrylate, 1-ethyleneadamantyl (meth)acrylate, 3,7-dimethyl-1-adamantyl (meth)acrylate, tricyclodecanyl (meth)acrylate, norbornane (meth)acrylate, mentyl (meth)acrylate, n-propyl (meth)acrylate, isopropyl (meth)acrylate, 2-ethylhexyl (meth)acrylate, isodecyl (meth)acrylate, isooctyl (meth)acrylate, lauryl (meth)acrylate, cyclohexyl (meth)acrylate, tetrahydrofuranyl (meth)acrylate, tetrahydropyranyl (meth)acrylate, 3-oxocyclohexyl (meth)acrylate, butyrolactone (meth)acrylate and mevalonic lactone (meth)acrylate; conjugated dienes such as 1,3-butadiene, isoprene, 2,3-dimethyl-1,3-butadiene, 1,3-pentadiene, 2-methyl-1,3-pentadiene, 1,3-hexadiene, 1,6-hexadiene, 4,5-diethyl-1,3-octadiene, 3-butyl-1,3-octadiene and chloroprene; α,β-unsaturated carboxylic imides such as N-methylmaleimide and N-phenylmaleimide; and α,β-unsaturated nitriles such as (meth)acrylonitrile. These monomers can be used singly or in combination of two or more thereof.

In the case where the polymer of the invention is a block polymer in which the block chain B, the block chain A and the block chain B are bound in this order, as described previously, it is preferable that its number average molecular weight is in the range of from 50,000 to 500,000. When the number average molecular weight is 50,000 or more, thermal properties and physical properties are enhanced. Also, where the number average molecular weight is not more than 500,000, molding properties or fabrication properties are enhanced.

A ratio (Mw/Mn) of a weight average molecular weight (Mw) to a number average molecular weight (Mn) of the foregoing polymer is preferably in the range of from 1.01 to 2.50, and more preferably in the range of from 1.01 to 1.50. By making the ratio (Mw/Mn) fall within the foregoing range, the micro-phase separation structure is easily formed.

In the case where the polymer of the invention is the foregoing star polymer, though its number average molecular weight is not particularly limited, it is preferably in the range of from 50,000 to 1,000,000. By making the ratio (Mw/Mn) fall within the foregoing range, not only thermal properties and physical properties can be enhanced, but molding properties or fabrication properties can be enhanced.

A ratio (Mw/Mn) of a weight average molecular weight (Mw) to a number average molecular weight (Mn) is preferably in the range of from 1.001 to 2.50. By making the ratio (Mw/Mn) fall within the foregoing range, the micro-phase separation structure is easily formed.

It is preferable that a proportion of the total sum of the repeating unit (I) and the repeating unit (II) relative to the whole of the repeating units is in the range of from 50 to 90% by weight, with a proportion of the repeating unit (III) being in the range of from 50 to 10% by weight. By making the proportions of the repeating units (I), (II) and (III) fall within the foregoing ranges, the micro-phase separation structure is easily formed.

It is preferable that the arm part contains a structure represented by the following formula (VI).

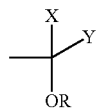

(VI)

In the formula (VI), Y represents a group composed of a polymer chain; X represents a group composed of a polymer chain, an organic group other than the group composed of a polymer chain, or a hydrogen atom; and R represents a hydrogen atom or an alkyl group having from 1 to 4 carbon atoms.

Y and X which are a group composed of a polymer chain are each preferably one composed of a polymer chain having two or more functional groups in an end thereof. When the functional group is a hydroxyl group-containing group or an active halogen-containing group, the polymer chain can be further extended from the end. Such a functional group may be a functional group capable of being converted to a hydroxyl group-containing group or a functional group capable of being converted to an active halogen-containing group.

The polymer chain corresponding to X and Y in the arm part is a polymer chain derived from a polymerizable double bond-containing monomer, and examples thereof include polymer chains derived from the monomers specifically exemplified above as the polymerizable double bond-containing monomer corresponding to each of the repeating units (I), (II) and (III).

Y or X which is a group composed of a polymer chain is preferably one composed of a polymer chain having two or more functional groups in an end thereof. When the functional group is a hydroxyl group-containing group or an active halogen-containing group, the polymer chain can be further extended from the end. Such a functional group may be a functional group capable of being converted to a hydroxyl group-containing group or a functional group capable of being converted to an active halogen-containing group.

Though the structure of an end of the polymer chain which further extends from the polymer chain having two or more functional groups in an end thereof is not particularly limited, specifically, it is preferably a polymer chain having an end containing a structure having a carbon skeleton represented by the following formula (VI-I) or (VI-II).

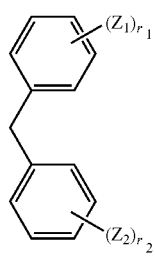

(VI-I)

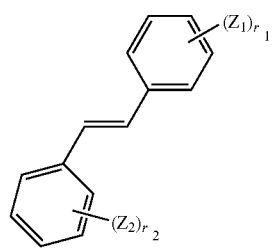

(VI-II)

In the formulae (VI-I) and (VI-II), $Z_1$ and $Z_2$ each independently represents a hydroxyl group, an active halogen-containing functional group, a hydroxyalkyl group, a halogenated alkyl group, OR' (wherein R' represents a hydrogen atom or an organic group), a functional group capable of being converted to a hydroxyl group-containing functional group, a functional group capable of being converted to an active halogen-containing functional group, or a polymer chain-containing functional group; r1 and r2 each represents an integer of from 1 to 5; and when r1 or r2 is 2 or more, $Z_1$s and $Z_2$s may be the same or different, respectively.

Examples of R' include an alkyl group, a silyl group, a phosphoryl group, a sulfonyl group, an acyl group and a group composed of a polymer chain.

Examples of a group capable of being converted to a hydroxyl group-containing group and a group capable of being converted to an active halogen-containing group, each of which is the functional group of the star polymer, include a sillyloxyalkyl group such as a trimethylsilyloxymethyl group, a 2-trimethylsilyloxyethyl group, a t-butyldimethylsilyloxymethyl group and a dimethylphenylsilyloxymethyl group; an aryloxyalkyl group such as a phenoxymethyl group and a naphthoxymethyl group; an alkoxyalkyl group such as a methoxymethyl group, a t-butoxymethyl group, an ethoxymethyl group, a 1-methoxyethoxymethyl group, a 1-methoxymethoxymethyl group and a 1-ethoxyethoxymethyl group; a t-butoxycarbonyl group; and a tetrahydropyranyloxymethyl group, and the like. In view of easiness of the reaction, a silyloxyalkyl group and a tetrahydropyranyloxymethyl group are especially preferable.

Besides the above-exemplified groups, examples of the group represented by $Z_1$ and $Z_2$ include a hydroxymethyl group, a 1-hydroxyethyl group, a 2-hydroxyethyl group, a 1-hydroxybenzyl group, a chloromethyl group, a dichloromethyl group and a 1-chlorobenzyl group, etc.

In the case where $Z_1$ or $Z_2$ is a polymer chain-containing functional group, the form which the polymer chain is bound to the phenyl group is not particularly limited. A polymer chain may be formed though extension from the phenyl moiety; or a polymer chain may be formed by aligning a functional group capable of forming a bond upon a reaction with a polymer end anion on the phenyl group or the periphery thereof, thereby allowing it to react with a polymer end anion.

The active halogen-containing group is preferably a group having a halogen atom at the α-position of the aromatic ring or a group having a structure presented by the following formula (VII-I) or (VII-II).

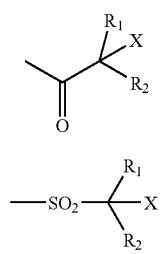

(VII-I)

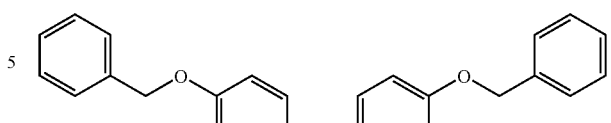

(VII-II)

In the formulae (VII-I) and (VII-II), X represents a halogen atom; and $R_1$ and $R_2$ each independently represents a hydrogen atom, a halogen atom or an organic group, provided that $R_1$ and $R_2$ do not represent a halogen atom at the same time.

As to $R_1$ and $R_2$, specific examples of the halogen atom include a fluorine atom, a chlorine atom, a bromine atom and an iodine atom; and the organic group is not particularly limited so far as it is a functional group having one or more carbon atoms. Specific examples of the organic group include an alkyl group such as a methyl group and an ethyl group; a cycloalkyl group such as a cyclopropyl group; an alkenyl group such as an allyl group; an alkynyl group such as a propargyl group; an aryl group such as a phenyl group and a pyridyl group; an alkoxycarbonyl group such as a methoxycarbonyl group; an acyl group such as an acetyl group, a benzoyl group and a formyl group; a sulfonyl group such as a methanesulfonyl group; a hydrocarbon oxy group such as a methoxy group, an ethoxy group, a phenoxy group and an acetoxy group; and a hydrocarbon thio group such as a methylthio group and a phenylthio group and an oxide thereof.

The core part in the star polymer of the invention is preferably a group having two or more bonding hands and capable of forming a star polymer having the structure represented by the foregoing formula (IV). Examples of the core part include a chain or cyclic aliphatic group, an aromatic group and a heterocyclic group. Of these, a group having one or more aromatic rings such as an aromatic group and an aromatic hydrocarbon group in a skeleton thereof and having a structure capable of branching the arm part represented by the formula (IV) directly from the foregoing aromatic ring is preferable. Specific examples of the aromatic compound which can become the core part include core parts represented by the foregoing formula (V). A star polymer having a structure in which the arm part represented by the formula (IV) branches this core part directly from the four benzene rings is more preferable. Specific examples thereof include those described in *J. Am. Chem. Soc.*, Vol. 118, No. 37, 8647 (1996) and those exemplified below.

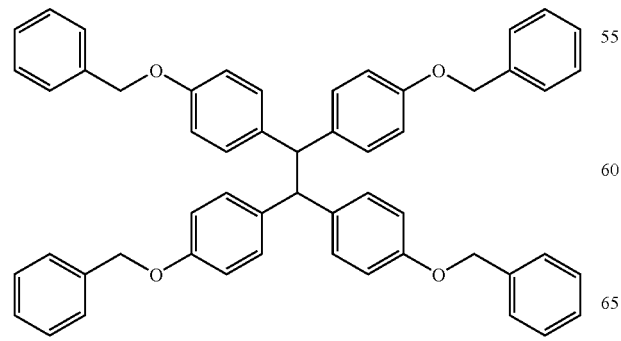

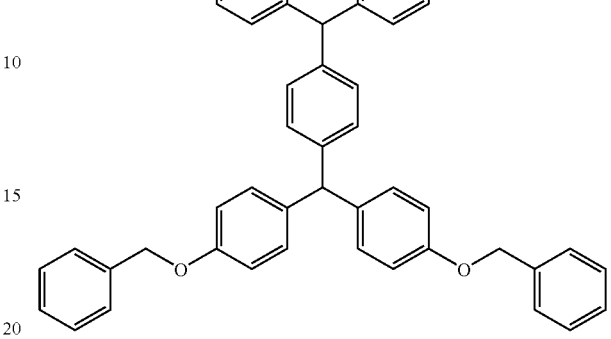

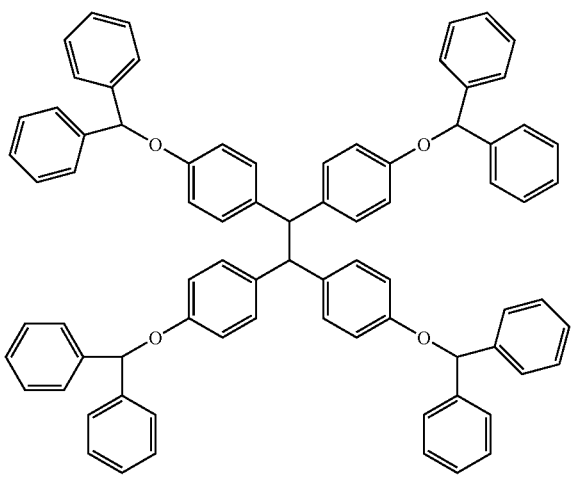

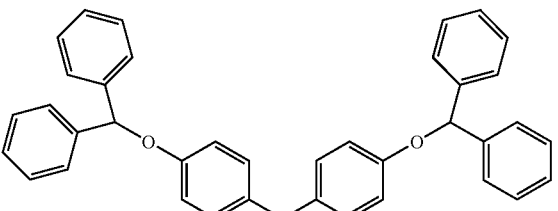

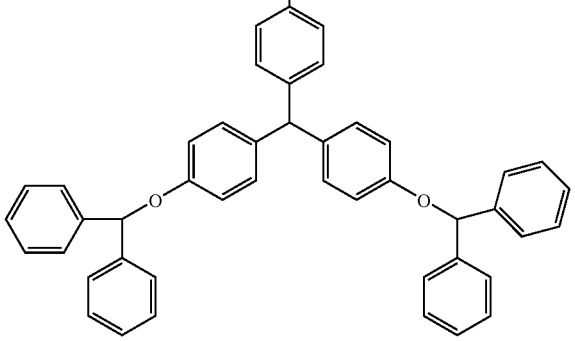

-continued

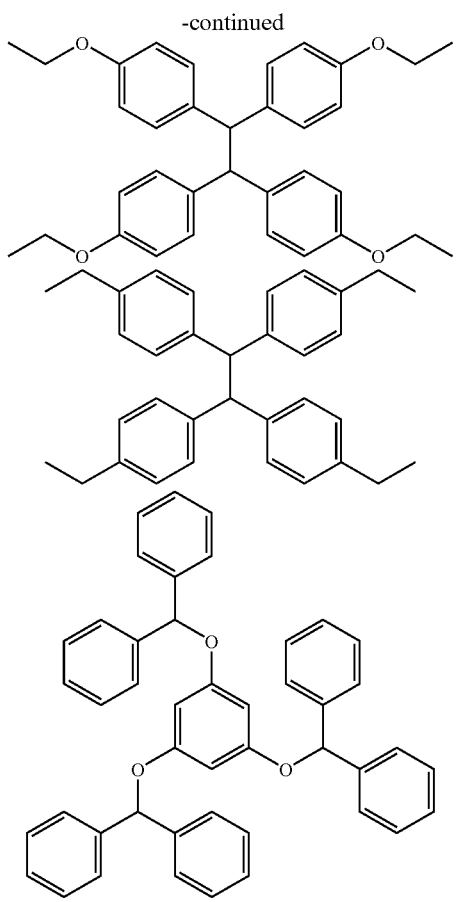

The repeating unit (I) is preferably contained in an amount of from 90 to 99.9% by weight, and more preferably contained in an amount of from 90 to 99.5% by weight in the polymer chain constituting the arm part. When the repeating unit (I) is contained in an amount falling within the foregoing range, adhesive (binding) strength, film strength, conductivity, solvent resistance (electrolytic liquid resistance) and heat shrinkage resistance are more excellent.

It is preferable that the repeating unit (I) and the repeating unit (II) are randomly contained in the polymer chains X and Y in the foregoing formula (IV). Though a ratio of the repeating unit (I) and the repeating unit (II) is not particularly limited, a weight ratio (I)/(II) is preferably in the range of from 9 to 99. The repeating unit (II) to be contained in the polymer may be a single kind or a mixture of two or more kinds thereof. The molar number of the repeating unit (II) may be in the range wherein a film having satisfactory thermal properties and physical properties can be formed through a crosslinking reaction and is preferably 5 moles or more.

In the case where the repeating unit (II) to be contained in the foregoing polymer is a repeating unit which is derived from a (meth)acrylate having a hydroxyl group in an ester moiety thereof as a monomer, the content of the repeating unit (II) in the polymer is preferably in the range of from 0.1 to 12.0% by weight, more preferably in the range of from 0.1 to 6.0% by weight, and further preferably in the range of from 0.1 to 1.5% by weight.

The content of the repeating unit represented by the foregoing formula (IV) in the polymer is preferably in the range of from 60 to 85% by weight, and more preferably in the range of from 60 to 80% by weight.

The case where the polymer of the invention is a crosslinked polymer is hereunder described.

The crosslinked polymer of the invention can be formed through a reaction between the functional group of the repeating unit (II) and a crosslinking agent.

The crosslinking agent is not particularly limited so far as it is able to achieve crosslinking through a reaction with a reaction point of a hydroxyl group or the like to be contained in the repeating unit (II). A polyisocyanate compound containing two or more isocyanate groups in a molecule thereof is preferably used.

Though the use amount of the crosslinking agent is not particularly limited, it is preferably in the range of from 0.1 to 2 moles, and more preferably in the range of from 0.8 to 1.2 moles per mole of the repeating unit (II). When the crosslinking agent is used in an amount in the range of from 0.1 to 2 moles, not only satisfactory thermal properties and physical properties are obtainable, but a crosslinked polymer having a sufficient conductivity can be obtained.

Specific examples of the polyisocyanate compound include polyisocyanates such as tolylene diisocyanate (TDI), diphenylmethane diisocyanate (MDI), hydrogenated diphenylmethane diisocyanate (H-MDI), triphenylmethane triisocyanate, polyphenylmethane polyisocyanate (crude MDI), modified diphenylmethane diisocyanate (modified MDI), hydrogenated xylylene diisocyanate (H-XDI), xylylene diisocyanate (XDI), hexamethylene diisocyanate (HMDI), trimethylhexamethylene diisocyanate (TMHMDI), tetramethylxylylene diisocyanate (m-TMXDI), isophorone diisocyanate (IPDI), norbornene diisocyanate (NBDI), 1,3-bis(isocyanatomethyl)cyclohexane (H6XDI) and 1,5-naphthalene diisocyanate; trimer compounds of these polyisocyanates; and reaction products of such a polyisocyanate and a polyol.

Block isocyanates obtained by blocking a part or the whole of isocyanate groups with a known blocking agent such as phenol compounds and oximes may be used. If desired, a chain extender such as ethylene glycol, propylene glycol, hexamethylene-1,6-diol and polyethylene glycol can be used jointly.

In case of using a polyisocyanate compound, if desired, an amine such as triethylamine, triethylenediamine and hexamethylenetetramine; a heavy metal compound such as cobalt naphthenate, tetra-n-butyltin and dibutyltin dilaurate; or the like can be used jointly as a curing accelerator.

EXAMPLES

The invention is specifically described below with reference to the following Examples, but it should not be construed that the invention is limited to these Examples.

In the following Examples and Comparative Examples, the term "wt %" is % by weight.
[Preparation of Polymer-A]
(1) Synthesis of B-A1-B Copolymer:

Under a nitrogen atmosphere, 360.5 g (323.8 mmoles) of methoxy polyethylene glycol monomethacrylate (BLEMMER PME-1000, manufactured by NOF Corporation, which is a polymer represented by the foregoing formula (I) wherein $R^1$, $R^2$, $R^{4a}$ and $R^{4b}$ are each a hydrogen atom, $R^3$ and $R^5$ are each a methyl group, and m is 23; hereinafter referred to as "PME-1000"), 40.1 g (308.1 mmoles) of 2-hydroxyethyl methacrylate (hereinafter referred to as "HEMA") and 1,200 g of toluene were taken in a flask and uniformly mixed, and the mixture was then subjected to a deaeration treatment. 1.9 g (2.0 mmoles) of dichlorotris(triphenylphosphine)ruthenium and 1.2 g (9.3 mmoles) of di-n-butylamine were added to this mixed solution, to which was then further added 0.9 g (4.8 mmoles) of 2,2-dichloroacetophenone, and the mixture was heated to 80° C. with stirring to initiate a polymerization reaction.

After a lapse of 47 hours after initiation of the polymerization reaction, the temperature of the reaction system was cooled to 0° C., thereby terminating the polymerization reaction. NMR (Nuclear Magnetic Resonance) revealed that the conversion of PME-1000 and HEMA was 83% and 99%, respectively. The reaction solution was subjected to column purification to remove the metal complex and unreacted monomers, and the volatile matter was removed in vacuo, thereby preparing a 30 wt % toluene solution. A polymerization yield relative to the total amount of the used monomers was 58%.

There was thus obtained a random copolymer of PME-1000 and HEMA. As a result of analysis by a multi angle laser light scattering detector (hereinafter abbreviated as "GPC-MALLS), the obtained copolymer had an Mn of 175,000 and an Mw/Mn of 1.48. The thus obtained polymer is abbreviated as "P-PME/HEMA-1".

Subsequently, under a nitrogen atmosphere, 43.9 g (0.25 mmoles) of P-PME/HEMA-1, 30.5 g (292.8 mmoles) of styrene (hereinafter abbreviated as "St") and 175 g of toluene were taken in a flask and uniformly mixed, and the mixture was then subjected to a deaeration treatment. 0.12 g (0.15 mmoles) of chloropentamethylcyclopentadienyl bis(triphenylphosphine)ruthenium (hereinafter abbreviated as "CPS") and 0.1 g (0.8 mmoles) of di-n-butylamine were added to this mixed solution, and the mixture was heated to 100° C. to initiate a copolymerization reaction.

After a lapse of 45 hours after initiation of the copolymerization reaction, the temperature of the reaction system was cooled to 0° C., thereby terminating the copolymerization reaction. A polymerization yield of styrene was 22%. A viscous residue obtained by reprecipitation with a large amount of n-hexane was dried in vacuo at 60° C. for 12 hours.

There was thus obtained a copolymer in which a block chain B composed of polystyrene (PSt) and a block chain A1 composed of P-PME/HEMA-1 were bound in the order of B-A1-B.

As a result of $^1$H-NMR analysis, this copolymer had a polymer composition ratio of PME-1000/HEMA/St of 78.9/10.5/10.6 (wt %) and a PEO (polyethylene oxide) content of 72%. Also, as a result of GPC-MALLS analysis, this copolymer had an Mn of 193,000 and an Mw/Mn of 1.27.

25 g of Polymer-A was dissolved in 475 g of dimethoxy carbonate (DMC) and made uniform, thereby preparing a 5% by weight solution. 1.66 g of tolylene diisocyanate (TDI) as a crosslinking agent was added in the solution, and the mixture was stirred at room temperature for 3 days to obtain a Polymer-A solution for coating a positive electrode.

[Preparation of Polymer-B]
(1) Synthesis of B-A2-B Copolymer:

Under a nitrogen atmosphere, 270.7 g (243.1 mmoles) of PME-1000, 30.1 g (231.3 mmoles) of HEMA and 900 g of toluene were taken in a flask and uniformly mixed, and the mixture was then subjected to a deaeration treatment. 1.4 g (1.5 mmoles) of dichlorotris(triphenylphosphine)ruthenium and 0.8 g (6.0 mmoles) of di-n-butylamine were added to this mixed solution, to which was then further added 0.58 g (3.1 mmoles) of 2,2-dichloroacetophenone, and the mixture was heated to 80° C. with stirring to initiate a polymerization reaction.

After a lapse of 45 hours after initiation of the polymerization reaction, the temperature of the reaction system was cooled to 0° C., thereby terminating the polymerization reaction. NMR revealed that the conversion of PME-1000 and HEMA was 80% and 99%, respectively. The reaction solution was subjected to column purification to remove the metal complex and unreacted monomers, and the volatile matter was removed in vacuo, thereby preparing a 30 wt % toluene solution. A polymerization yield relative to the total amount of the used monomers was 77%.

There was thus obtained a random copolymer of PME-1000 and HEMA. As a result of GPC-MALLS analysis, the obtained copolymer had an Mn of 155,000 and an Mw/Mn of 1.33. The thus obtained polymer is abbreviated as "P-PME/HEMA-2".

Subsequently, under a nitrogen atmosphere, 190.0 g (1.2 mmoles) of P-PME/HEMA-2, 126.7 g (1.2 moles) of St and 740 g of toluene were taken in a flask and uniformly mixed, and the mixture was then subjected to a deaeration treatment. 0.4 g (0.5 mmoles) of CPS and 0.3 g (2.3 mmoles) of di-n-butylamine were added to this mixed solution, and the mixture was heated to 100° C. to initiate a copolymerization reaction.

After a lapse of 45 hours after initiation of the copolymerization reaction, the temperature of the reaction system was cooled to 0° C., thereby terminating the copolymerization reaction. A polymerization yield of styrene was 16%. A viscous residue obtained by reprecipitation with a large amount of n-hexane was dried in vacuo at 60° C. for 12 hours.

There was thus obtained a copolymer in which a block chain B composed of polystyrene (PSt) and a block chain A2 composed of P-PME/HEMA-2 were bound in the order of B-A2-B.

As a result of $^1$H-NMR analysis, this copolymer had a polymer composition ratio of PME-1000/HEMA/St of 80.9/11.2/7.9 (wt %) and a PEO (polyethylene oxide) content of 74%. Also, as a result of GPC-MALLS analysis, this copolymer had an Mn of 271,000 and an Mw/Mn of 1.65.

100 g of Polymer-B was dissolved in 400 g of dehydrated 1-methyl-2-pyrrolidone (NMP) and made uniform, thereby preparing a 20% by weight solution. 7.31 g of tolylene diisocyanate (TDI) as a crosslinking agent was added in the solution, and the mixture was stirred at room temperature for 6 days to obtain a Polymer-B solution for adding a positive electrode mixture.

[Preparation of Polymer-C]
Synthesis of an Arm Having an OTBDMS Group (t-butyldimethylsilyloxymethyl Group)

283.6 g of dehydrated tetrahydrofuran (hereinafter abbreviated as "THF"), 2,654.3 g of dehydrated toluene and 34.9 g (74.4 mmoles) of DPE-(m-MOTBDMS)$_2$ [1,1-bis[(3-t-butyldimethylsilyloxy)methylphenyl]ethylene] were added in a nitrogen-purged 5,000-mL four-necked flask, and the reaction system was kept at −40° C. with stirring. 29.8 g (70.0 mmoles) of a 1.6 moles/L solution of n-butyllithium/hexane was added in the reaction system, and the mixture was stirred for 30 minutes. Thereafter, 525.4 g (5.0 moles) of styrene was added in the reaction system to achieve polymerization. 20 minutes after completion of the dropwise addition, sampling was carried out, and completion of the polymerization was confirmed by gas chromatography (hereinafter abbreviated as "GC"). As a result of gel permeation chromatography (hereinafter abbreviated as "GPC"), this polymer solution was a unimodal polymer having a molecular weight Mn of 8,900 and a degree of dispersion Mw/Mn of 1.03.

Star-Forming Reaction 3.9 g (6.3 mmoles) of 1,1,2,2-tetrakis-(4-ethoxycarbonylphenyl)ethane dissolved in 100 mL of dehydrated THF was added in this reaction system, and after continuing the reaction for 30 minutes, the reaction was terminated with methanol. This polymerization solution was thrown into a large amount of methanol to deposit a polymer. After filtration and washing, the residue was dried in vacuo at 50° C. for 5 hours to obtain 580 g of a white powdered polymer.

An excessive amount of an arm polymer was removed by means of aliquot GPC, thereby obtaining a white powdered eight-arm star polymer. As a result of measurement by GPC-MALLS, this polymer was a unimodal polymer having a molecular weight Mw of 72,700 and a degree of dispersion Mw/Mn of 1.00.

Functional Group Conversion (Conversion of OTBDMS Group to OH Group)

2,500 mL of dehydrated THF, 550 g of the above-manufactured eight-arm star polymer and 1,200 mL of tetra-n-butylammonium fluoride (TABF) (1.0 M in THF) were charged in a nitrogen-purged 5,000-mL flask, and the mixture was stirred at room temperature overnight. The solvent was concentrated to a half, and this solution was thrown into a large amount of methanol to deposit a polymer. After filtration and washing, the residue was dried in vacuo at 50° C. for 5 hours to obtain 520 g of a white powdered polymer.

Functional Group Conversion (Conversion of OH Group to OBiB Group (bromoisobutyroyloxymethyl Group))

2,300 mL of dehydrated THF, 520 g (6.7 mmoles) of the foregoing OH group-converted eight-arm star polymer (OH group) and 22.8 g (0.22 moles) of triethylamine were charged in a nitrogen-purged 5,000-mL four-necked flask, and the reaction system was kept at 0° C. with stirring. 38.8 g (0.17 mmoles) of bromoisobutyryl bromide was gradually added to the reaction system, and after completion of the dropwise addition, the mixture was returned to room temperature and stirred overnight. After removing TEA bromated by filtration, the solvent was concentrated to a half, and this solution was thrown into a large amount of methanol to deposit a polymer, followed by filtration and washing. The obtained polymer was subjected to factional purification with THF/methanol and then reprecipitated with a large amount of methanol, followed by drying in vacuo at 50° C. for 12 hours to obtain 389 g of a white powdered polymer.

As a result of measurement by GPC-MALLS, this polymer was a unimodal polymer having a molecular weight Mw of 74,700 and a degree of dispersion Mw/Mn of 1.002.

Living Radical Polymerization 30.0 g (0.4 mmoles) of the foregoing bromoisobutyroyloxymethyl group-converted eight-arm star polymer, 193.3 g (173.6 mmoles) of PME-1000, 10.3 g (78.8 mmoles) of HEMA and 924 g of toluene were charged in a 2,000-mL flask, followed by deaeration. 1.2 g (1.3 mmoles) of dichlorotris(triphenylphosphine)ruthenium was added and uniformly dissolved. Thereafter, 0.95 g (5.1 mmoles) of tributylamine was added, and the mixture was heated to 80° C. to initiate a polymerization reaction. After a lapse of 8 hours after initiation of the polymerization reaction, 10 mL of acetonitrile was added to the reaction solution, and the mixture was stirred for 30 minutes, thereby terminating the polymerization reaction. NMR revealed that the conversion of PME-1000 and HEMA was 72% and 98%, respectively. The reaction solution was subjected to column purification to remove the metal complex and unreacted monomers. The solvent was concentrated in vacuo, and N-methylpyrrolidone (hereinafter abbreviated as "NMP") was added to prepare a 10% NMP solution. As a result of $^1$H-NMR analysis, this copolymer had a polymer composition ratio of PME-1000/HEMA/St of 78.9/5.7/15.4 (wt % ratio) and a PEO (polyethylene oxide) content of 72 wt %.

Also, as a result of GPC-MALLS analysis, this copolymer had an Mw of 488,000 and an Mw/Mn of 1.15.

30 g of Polymer-C was dissolved in 270 g of dehydrated NMP and made uniform, thereby preparing a 10% by weight solution. 1.14 g of tolylene diisocyanate (TDI) as a crosslinking agent was added in the solution, and the mixture was stirred at room temperature for 6 days to obtain a Polymer-C solution for adding a positive electrode mixture.

[Preparation of Polymer-D]

(1) Synthesis of B-A3-B Copolymer:

Under a nitrogen atmosphere, 95.1 g (85.3 mmoles) of PME-1000, 5.0 g (38.4 mmoles) of HEMA and 300 g of toluene were taken in a flask and uniformly mixed, and the mixture was then subjected to a deaeration treatment. 0.24 g (0.25 mmoles) of dichlorotris(triphenylphosphine)ruthenium and 0.13 g (1.0 mmole) of di-n-butylamine were added to this mixed solution, to which was then further added 0.09 g (0.5 mmoles) of 2,2-dichloroacetophenone, and the mixture was heated to 80° C. with stirring to initiate a polymerization reaction.

After a lapse of 23 hours after initiation of the polymerization reaction, the temperature of the reaction system was cooled to 0° C., thereby terminating the polymerization reaction. NMR revealed that the conversion of PME-1000 and HEMA was 70% and 97%, respectively. The reaction solution was subjected to column purification to remove the metal complex and unreacted monomers, and the volatile matter was removed in vacuo, thereby preparing a 30 wt % toluene solution. A polymerization yield relative to the total amount of the used monomers was 77%.

There was thus obtained a random copolymer of PME-1000 and HEMA. As a result of GPC-MALLS analysis, the obtained copolymer had an Mn of 163,000 and an Mw/Mn of 1.25. The thus obtained polymer is abbreviated as "P-PME/HEMA-3".

Subsequently, under a nitrogen atmosphere, 52.9 g (0.32 mmoles) of P-PME/HEMA-3, 31.2 g (299.6 mmoles) of St and 191 g of toluene were taken in a flask and uniformly mixed, and the mixture was then subjected to a deaeration treatment. 0.15 g (0.16 mmoles) of dichlorotris(triphenylphosphine)ruthenium and 0.1 g (0.8 mmoles) of di-n-butylamine were added to this mixed solution, and the mixture was heated to 100° C. to initiate a copolymerization reaction.

After a lapse of 26 hours after initiation of the copolymerization reaction, the temperature of the reaction system was cooled to 0° C., thereby terminating the copolymerization reaction. A polymerization yield of styrene was 26%. A viscous residue obtained by reprecipitation with a large amount of n-hexane was dried in vacuo at 60° C. for 12 hours.

There was thus obtained a copolymer in which a block chain B composed of polystyrene (PSt) and a block chain A3 composed of P-PME/HEMA-3 were bound in the order of B-A3-B.

As a result of $^1$H-NMR analysis, this copolymer had a polymer composition ratio of PME-1000/HEMA/St of 81.2/6.0/12.8 (wt %) and a PEO (polyethylene oxide) content of 74%. Also, as a result of GPC-MALLS analysis, this copolymer had an Mn of 169,000 and an Mw/Mn of 1.14.

29 g of Polymer-D was dissolved in 261 g of dehydrated NMP and made uniform, thereby preparing a 10% by weight solution. 1.16 g of tolylene diisocyanate (TDI) as a crosslinking agent was added in the solution, and the mixture was stirred at room temperature for 6 days to obtain a Polymer-D solution for adding a positive electrode mixture.

[Preparation of Polymer-E]

Living Radical Polymerization 7.6 g (0.1 mmoles) of the foregoing bromoisobutyroyloxymethyl group-converted eight-arm star polymer in the preparation of Polymer-C, 42.0 g (37.7 mmoles) of PME-1000, 0.5 g (4.1 mmoles) of HEMA and 200 g of toluene were charged in a 500-mL flask, followed by deaeration. 0.3 g (0.3 mmoles) of dichlorotris(triphenylphosphine)ruthenium was added and uniformly dissolved. Thereafter, 0.24 g (1.3 mmoles) of tributylamine was added, and the mixture was heated to 80° C. to initiate a polymerization reaction. After a lapse of 8 hours after initiation of the polymerization reaction, 3 mL of acetonitrile was added to the reaction solution, and the mixture was stirred for 30 minutes, thereby terminating the polymerization reaction. NMR revealed that the conversion of PME-1000 and HEMA was 70% and 100%, respectively. The reaction solution was subjected to column purification to remove the metal complex and unreacted monomers. The solvent was concentrated in vacuo, and NMP was added to prepare a 10% NMP solution. As a result of $^1$H-NMR analysis, this copolymer had a polymer composition ratio of PME-1000/HEMA/St of 78.6/1.5/19.9 (wt % ratio) and a PEO (polyethylene oxide) content of 71 wt %.

Also, as a result of GPC-MALLS analysis, this copolymer had an Mw of 394,000 and an Mw/Mn of 1.13.

23 g of Polymer-E was dissolved in 207 g of dehydrated NMP and made uniform, thereby preparing a 10% by weight solution. 0.23 g of tolylene diisocyanate (TDI) as a crosslinking agent was added in the solution, and the mixture was stirred at room temperature for 6 days to obtain a Polymer-E solution for adding a positive electrode mixture.

<Preparation and Evaluation of Lithium Secondary Battery>

A lithium secondary battery was prepared using a positive electrode prepared in each of the following Examples and Comparative Examples. Preparation of a negative electrode, preparation of a non-aqueous electrolytic liquid, assembling of the battery and evaluation tests of the battery are as follows.

[Preparation of Negative Electrode]

An aqueous solution of 1% by weight of carboxymethyl cellulose (a trade name: CMC 1380, manufactured by Daicel Chemical Industries, Ltd.) dissolved therein was prepared. Graphite as a negative electrode active material and SBR (styrene butadiene rubber) were mixed in this CMC aqueous solution in a weight ratio (graphite/SBR/CMC) of 98/1/1 using a mixing device (T.K. CONBIMIX, manufactured by Primix Corporation), thereby preparing a slurry. The obtained slurry was coated on the both surfaces of a copper foil and dried, followed by rolling so as to have a filling density of 1.60 g/mL, thereby preparing a negative electrode.

[Preparation of Non-Aqueous Electrolytic Liquid]

1.0 mole/L of $LiPF_6$ was dissolved in a solvent prepared by mixing ethylene carbonate (EC) and diethyl carbonate (DEC) in a volume ratio of 3/7, thereby preparing a non-aqueous electrolytic liquid.

[Assembling of Battery]

A lead terminal was installed in each of the positive electrode and the negative electrode; the positive electrode and the negative electrode were superimposed via a separator (made of polyethylene, film thickness: 16 μm, porosity: 47%); and the assembly was helically wound up and pressed, thereby forming a flattened electrode body. This electrode body was put into an exterior body made of an aluminum laminate film, and the foregoing non-aqueous electrolytic liquid was injected thereinto, followed by sealing to prepare a lithium secondary battery. This secondary battery has a design capacity of 750 mAh. The design capacity of the battery was designed on the basis of a charging final voltage of 4.40 V.

[Charge-Discharge Cycle Test]

Constant-current charge was carried out at a current of 1 It (750 mA) until the voltage reached 4.40 V, and charge was carried out at a constant voltage of 4.40 V until the current reached It/20 (37.5 mA). Thereafter, after allowing to stand for 10 minutes, constant-current discharge was carried out at a current of 1 It (750 mA) until the voltage reached 2.75 V.

[High-Temperature Storage Test]

In conformity with the design, the foregoing charge-discharge cycle test was carried out once at a rate of 1 It, and charge was again carried out at a rate of 1 It until the voltage reached 4.40V and charge was carried out at a constant voltage of 4.40 V until the current reached It/20 (37.5 mA). This battery was allowed to stand at 60° C. for 5 days. Thereafter, the battery was cooled to room temperature; discharge was carried out at a rate of 1 It; a residual capacity was calculated; the charge-discharge cycle test was again carried out at a rate of 1 It; and a reversible capacity was calculated on the basis of the discharge capacity at 1 It. Calculation expressions for calculating the residual capacity and the reversible capacity are shown below.

[Residual capacity (%)]=[(First discharge capacity after the storage test)/(Discharge capacity before the storage test)]×100

[Reversible capacity (%)]=[(Second discharge capacity after the storage test)/(Discharge capacity before the storage test)]×100

[Discharge Rate Test]

Constant-current charge was carried out at a current of 1 It (750 mA) until the voltage reached 4.40 V, and charge was carried out at a constant voltage of 4.40 V until the current reached It/20 (37.5 mA); and thereafter, constant-current discharge was carried out at 3 It (2,250 mA) or 2 It (1,500 mA) until the voltage reached 2.75 V. 3 It rate properties and 2 It rate properties were calculated according to the following calculation expressions.

[3 It rate properties (%)]=[(Discharge capacity at 3 It)/(Discharge capacity at 1 It)]×100

[2 It rate properties (%)]=[(Discharge capacity at 2 It)/(Discharge capacity at 1 It)]×100

<Effect to be Brought by Forming a Coating Layer on the Surface of the Positive Electrode>

The effect to be brought by forming a coating layer on the surface of the positive electrode according to the first aspect of the invention was investigated.

Example 1

A positive electrode was prepared in the following manner. Lithium cobalt oxide as a positive electrode active material, acetylene black as a carbon conductive agent and PVDF (polyvinylidene fluoride) as a binder were added in a weight ratio of 95/2.5/2.5 in NMP and mixed using a mixing device (T.K. HIVIS MIX, manufactured by Primix Corporation), thereby preparing a slurry.

The obtained slurry was coated on the both surface of an aluminum foil and dried, followed by rolling so as to have a filling density of 3.6 g/mL, thereby preparing a positive electrode.

The Polymer-A solution (PME/HEMA/St: 78.9/10.5/10.6 (wt %), a TDI crosslinked material) was dissolved in dimethyl carbonate (DMC) in a concentration of 1.0% by weight as reduced into the resin. The foregoing positive electrode was dipped in this DMC solution to form a polymer coating layer on the surface of the positive electrode. A coverage of the polymer coating layer was 0.028 mg/cm².

Using the thus prepared positive electrode, a battery was assembled in the manner as described above and designated as "invention battery T1".

Comparative Example 1

A positive electrode was prepared in the same manner as in Example 1, except that a polymer coating layer was not formed on the surface of the positive electrode. A battery was prepared using this positive electrode and designated as "comparative battery R1".

Example 2

A positive electrode was prepared in the same manner as in Example 1, except for changing the coverage of the polymer coating layer to 0.11 mg/cm$^2$. A battery was prepared using this positive electrode and designated as "invention battery T2".

With respect to the invention batteries T1 and T2 and the comparative battery R1, the results of high-temperature storage test and 3 It rate properties are shown in Table 1.

TABLE 1

|  | Surface Coverage | 3 It Rate Properties (%) | Results of Storage Test at 60° C. ||
|---|---|---|---|---|
|  |  |  | Residual Capacity (%) | Reversible Capacity (%) |
| Invention Battery T1 | 0.028 mg/cm$^2$ | 85.6 | 79.4 | 93.8 |
| Comparative Battery R1 | — | 90.1 | 19.1 | 76.6 |
| Invention Battery T2 | 0.11 mg/cm$^2$ | 35.9 | 75.6 | 90.0 |

As shown in Table 1, the residual capacity and reversible capacity after the storage at 60° C. of the batteries T1 and T2 according to the invention are higher than those of the comparative battery R1. Therefore, it was confirmed that by providing a coating layer composed of the polymer of the invention on the surface of the positive electrode according to the first aspect of the invention, the storage properties are enhanced.

As described previously, the crystal structure of lithium cobalt oxide charged at 4.4 V is instable in the coexistence of an electrolytic liquid, and the electrolytic liquid is easily decomposed due to its high oxidation action and catalytic action of the positive electrode. However, by providing a coating layer composed of the polymer of the invention on the surface of the positive electrode according to the first aspect of the invention, it is possible to suppress the oxidative decomposition of the electrolytic liquid and the decomposition of the electrolytic liquid to be caused due to the matter that the positive electrode active material works as a catalyst.

Though the electrolytic liquid which has penetrated in the inside of the battery at the initial stage of preparing the battery reacts, the excessive electrolytic liquid existing in the inside of the battery cannot freely circulate and react with the positive electrode due to the coating layer formed on the surface of the electrode. Therefore, it is possible to largely suppress the degree of progress of a side reaction. Also, since as described previously, the electrolytic liquid decomposed at the initial stage is suppressed on its circulation, side reaction products reside in the vicinity of the active material to bring a protective film-like action. Therefore, the storage properties can be largely improved as compared with the positive electrode not provided with a coating layer.

By providing a coating layer on the surface of the positive electrode, it is possible to exhibit the maximum effect by limitedly aligning a small amount of the polymer. For that reason, in comparison with the second aspect of the invention, the amount of the polymer to be used can be decreased, thereby bringing merits in view of costs.

On the other hand, in the 3 It rate properties, there was found a tendency that when the coating amount is high, the discharge rate properties are reduced. It is considered that such was caused due to the matter that the ionic conductivity is lowered by an increase in the thickness of the coating layer, thereby hindering the transfer of a lithium ion. Accordingly, it is preferable that the thickness of the coating layer is controlled to an extent that good rate properties can be kept while exhibiting the effect for improving the storage properties.

That is, as to the storage properties, in order to hinder the circulation of the electrolytic liquid, the thicker the coating layer, the higher the effect is. However, when the thickness of the coating layer increases, the rate properties are lowered, thereby causing a lowering of the charge-discharge properties. It is understood from the results as shown in Table 1 that it is preferable that the thickness of the coating layer is 0.01 mg/cm$^2$ or more. By regulating the thickness of the coating layer in such a way, not only a uniform film can be formed, but the storage performance can be improved. As described previously, when the thickness of the coating layer is too thick, the rate properties are lowered, and therefore, it is preferable that the coverage of the coating layer on the surface of the positive electrode is in the range of 0.01 to 0.05 mg/cm$^2$.

<Effect to be Brought by Forming an Additive Layer in the Positive Electrode Active Material Layer>

The effect to be brought by forming an additive layer in the positive electrode active material layer according to the second aspect of the invention was investigated.

Example 3

Lithium cobalt oxide as a positive electrode active material, acetylene black as a carbon conductive agent and PVDF as a binder were added in a weight ratio of 95/2.5/2.5 in NMP and mixed using the same mixing device as describe above, thereby preparing a slurry.

The Polymer-B solution (PME/HEMA/St: 80.9/11.2/7.9 (wt %), a TDI crosslinked material) was added in the foregoing slurry such that its content in the positive electrode active material layer was 0.25% by weight as reduced into the resin, and after the addition, the mixture was further stirred to prepare a positive electrode mixture slurry.

The positive electrode mixture slurry was coated on the both surfaces of an aluminum foil and dried, followed by rolling to prepare a positive electrode. The positive electrode had a filling density of 3.6 g/mL.

Using this positive electrode, a battery was prepared in the manner as described above. This battery was designated as "invention battery T3".

Comparative Example 2

A positive electrode was prepared in the same manner as in Example 3, except that PVDF was added in an amount of 0.25% by weight in place of the Polymer-B, and a battery was prepared using this positive electrode. This battery was designated as "comparative battery R2".

Example 4

A positive electrode was prepared in the same manner as in Example 3, except that Polymer-B was added in an amount of 0.01% by weight, and a battery was prepared using this positive electrode. This battery was designated as "invention battery T4".

Example 5

A positive electrode was prepared in the same manner as in Example 3, except that Polymer-B was added in an amount of 0.1% by weight, and a battery was prepared using this positive electrode. This battery was designated as "invention battery T5".

Example 6

A positive electrode was prepared in the same manner as in Example 3, except that Polymer-B was added in an amount of 0.5% by weight, and a battery was prepared using this positive electrode. This battery was designated as "invention battery T6".

Comparative Example 3

A positive electrode was prepared in the same manner as in Example 3, except that Polymer-B was added in an amount of 1.0% by weight, and a battery was prepared using this positive electrode. This battery was designated as "comparative battery R3".

With respect to the invention battery T3 and the comparative batteries R1 and R2, the results of storage test at 60° C. are shown in Table 2.

TABLE 2

| | Results of Storage Test at 60° C. | |
|---|---|---|
| | Residual Capacity (%) | Reversible Capacity (%) |
| Invention Battery T3 | 63.9 | 85.2 |
| Comparative Battery R1 | 19.1 | 76.6 |
| Comparative Battery R2 | 15.7 | 72.5 |

As shown in Table 2, in the invention battery T3 in which an additive layer composed of the polymer of the invention is formed in the surroundings of the binder for coating the positive electrode active material according to the second aspect of the invention, high residual capacity and reversible capacity are obtained as compared with the comparative battery R1 in which an additive layer is not formed. It was confirmed from this matter that the storage properties are improved by disposing the additive layer composed of a polymer in the surroundings of the binder for coating the positive electrode active material according to the invention.

Also, in the comparative battery R2, though PVDF is used as the additive, high residual capacity and reversible capacity as in the invention battery T3 are not obtained. It is understood from this matter that even when a large amount of the polymer is merely present in the vicinity of the positive electrode active material particle, the storage properties are not enhanced.

Polymer-B has a PEO (polyethylene oxide) site. Thus, it is supposed that the polymer of the invention uniformly aligns and coats in the surroundings of the binder for coating the positive electrode active material because it has such a site. In the light of the above, it is considered that by forming the additive layer composed of the polymer of the invention, the contact between the positive electrode active substance and the electrolytic liquid is restricted to suppress a side reaction, resulting in an enhancement of the storage properties.

According to the second aspect of the invention, since the additive layer can be formed in the surroundings of the positive electrode active material particle, the reaction between the positive electrode active material and the electrolytic liquid from the initial stage of assembling of the battery can be suppressed. For that reason, it is considered that a uniform positive electrode can be prepared and a more excellent effect for suppressing the reaction that than in the first aspect of the invention is obtainable.

With respect to the invention batteries T3 to T6 and the comparative batteries R1 and R3, the results of storage test at 60° C. and discharge rate properties (2 It/1 It) are shown in Table 3 and FIG. 1.

TABLE 3

| | Addition Amount of Polymer (wt %) | Results of Storage Test at 60° C. | | Discharge Rate Properties 2 It/1 It (%) |
|---|---|---|---|---|
| | | Residual Capacity (%) | Reversible Capacity (%) | |
| Comparative Battery R1 | 0.00 | 19.1 | 76.6 | 97.3 |
| Invention Battery T4 | 0.01 | 49.4 | 85.6 | 96.9 |
| Invention Battery T5 | 0.10 | 48.7 | 84.5 | 96.9 |
| Invention Battery T3 | 0.25 | 63.9 | 85.2 | 95.1 |
| Invention Battery T6 | 0.50 | 67.4 | 85.2 | 92.2 |
| Comparative Battery R3 | 1.00 | 69.6 | 86.0 | 83.9 |

As is clear from Table 3 and FIG. 1, it is understood that as the addition amount of the polymer for forming the additive layer increases, the residual capacity and reversible capacity in the storage test at 60° C. become high. However, when the addition amount of the polymer is 1.0% by weight, the discharge rate properties are lowered. It is supposed that the thickness of the additive layer is excessively thick so that the transfer of a lithium ion is hindered. Also, when the addition amount of the polymer increases, an energy density of the battery is lowered. Accordingly, it is understood that it is preferable that the addition amount of the polymer, namely the amount of the additive layer is not more than 0.5% by weight. Also, when the addition amount of the polymer is too low, the additive layer cannot be uniformly formed. Accordingly, it is preferable that the addition amount of the polymer, namely the amount of the additive layer is 0.01% by weight or more.

<Improvement Effect to be Caused Due to Polymer Structure>

Example 8

A positive electrode was prepared in the same manner as in Example 3, except that the Polymer-C solution (PME/HEMA/St: 78.9/5.7/15.4 (wt %), a TDI crosslinked material) was added in a concentration of 0.25% by weight as reduced into the resin in place of the Polymer-B. A battery was prepared using this positive electrode. This battery was designated as "invention battery T8".

Example 9

A positive electrode was prepared in the same manner as in Example 3, except that the Polymer-D solution (PME/HEMA/St: 81.2/6.0/12.8 (wt %), a TDI crosslinked material) was added in a concentration of 0.25% by weight as reduced into the resin in place of the Polymer-B. A battery was prepared using this positive electrode. This battery was designated as "invention battery T9".

With respect to the invention batteries T8 and T9, 3 It rate properties and the results of storage test at 60° C. are shown in Table 4. The Polymer-C used in the invention battery T8 is one having a polymer structure of a star polymer (hereinafter referred to as "star type"). Also, the Polymer-D used in the invention battery T9 is one having a polymer structure of a random block copolymer (hereinafter referred to as "linear type").

TABLE 4

|  | Polymer Structure | 3 It Rate Properties (%) | Results of Storage Test at 60° C. | |
|---|---|---|---|---|
|  |  |  | Residual Capacity (%) | Reversible Capacity (%) |
| Invention Battery T8 | Star Type | 85.1 | 71.2 | 86.3 |
| Invention Battery T9 | Linear Type | 78.2 | 71.5 | 86.9 |

Figure 2:
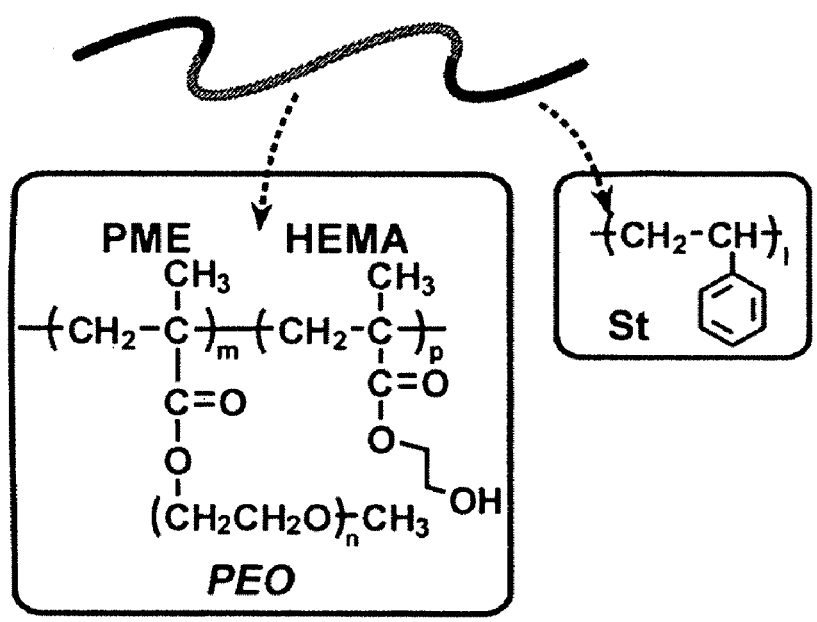
FIG. 2 is a drawing schematically showing a polymer having a linear type structure according to the invention.
Figure 3:
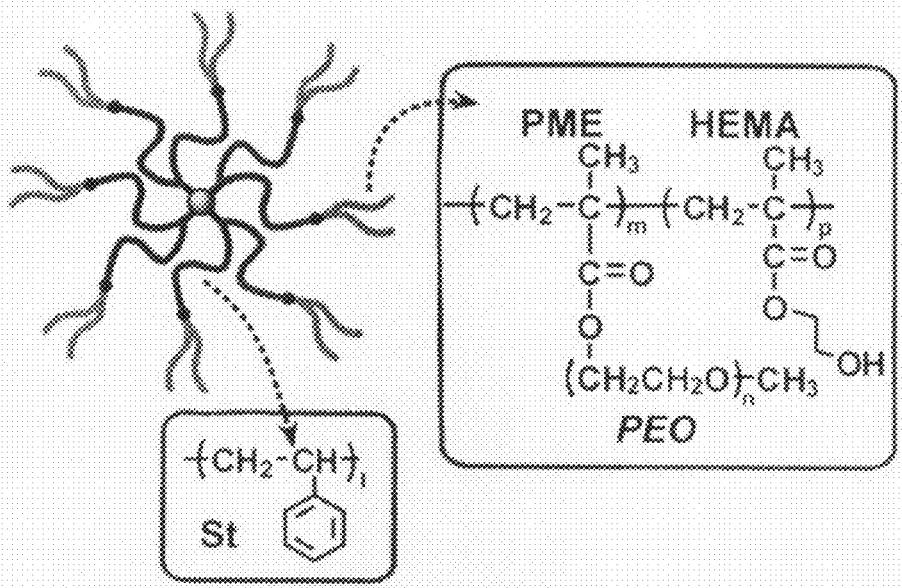
FIG. 3 is a drawing schematically showing a polymer having a star type structure according to the invention.

As shown in Table 4, in the invention battery T8 using a star type polymer, high rate properties are obtained as compared with the invention battery T9 using a linear type polymer. This is because since the star type polymer has a steric multi-branched structure, the size of the polymer per se is small as compared with the linear type polymer structure, and a micro-phase separation structure of a micro domain size is assumed. It is considered that by forming a polymer layer showing a micro and uniform micro-phase separation structure, the charge-discharge reaction becomes uniform so that the rate properties are enhanced. FIG. 2 schematically shows a polymer of a linear type structure; and FIG. 3 schematically shows a polymer of a star type structure.

Figure 4:
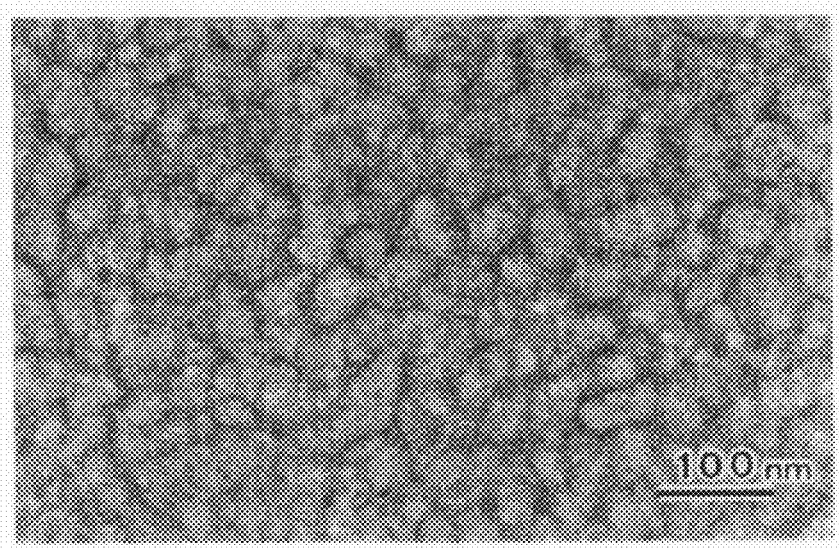
FIG. 4 is a transmission electron microscopic photograph of a polymer having a linear type structure in the invention.
Figure 5:
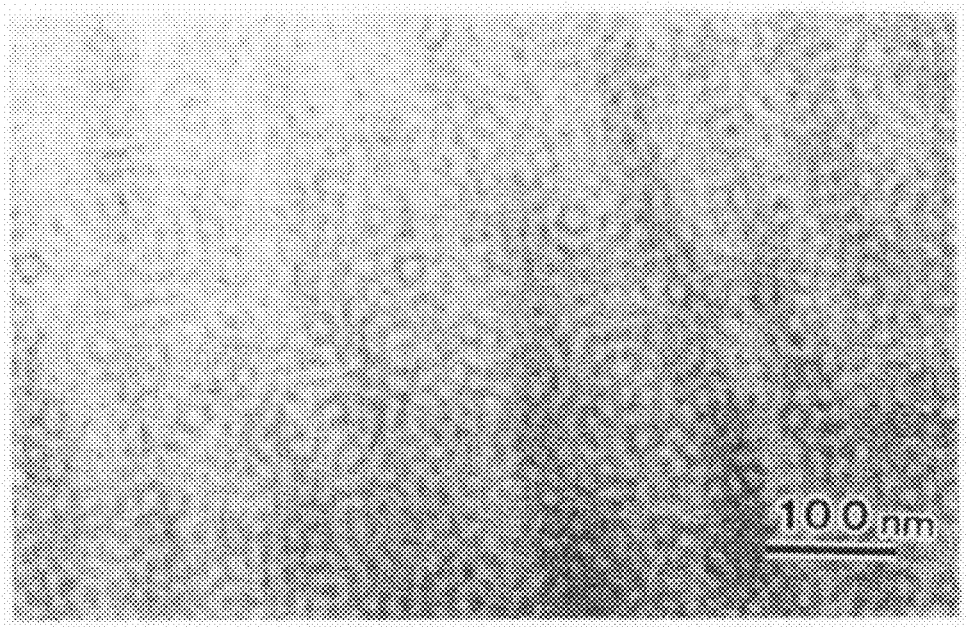
FIG. 5 is a transmission electron microscopic photograph of a polymer having a star type structure in the invention.

FIG. 4 is a transmission electron microscopic (TEM) photograph of a polymer thin film of a linear type structure; and FIG. 5 is a TEM photograph of a polymer having a star type structure.

As is clear from comparison between FIGS. 4 and 5, the polymer having a star type structure assumes a micro-phase separation structure of a micro domain size as compared with the polymer having a linear type structure.

In case of using the polymer having a linear type structure, it was understood that satisfactory results in both the storage properties and the rate properties are obtainable. In case of using the polymer of a star type structure, it was understood that more satisfactory effects are revealed.

Influences by the Amount of HEMA in a Polymer

Example 10

A positive electrode was prepared in the same manner as in Example 3, except that the Polymer-E solution (PME/HEMA/St: 78.6/1.5/19.9 (wt %), a TDI crosslinked material) was added in a concentration of 0.25% by weight as reduced into the resin in place of the Polymer-B. A battery was prepared using this positive electrode. This battery was designated as "invention battery T10".

With respect to the invention battery T10, 3 It rate properties and the results of storage test at 60° C. are shown in Table 5. The results of the invention battery T8 are also shown in Table 5.

TABLE 5

|  | PME/HEMA/St (wt %) | 3 It Rate Properties (%) | Results of Storage Test at 60° C. | |
|---|---|---|---|---|
|  |  |  | Residual Capacity (%) | Reversible Capacity (%) |
| Invention battery T8 | 78.9/5.7/15.4 | 85.1 | 71.2 | 86.3 |
| Invention battery T10 | 78.6/1.5/19.9 | 88.0 | 71.4 | 87.4 |

As is clear from the results as shown in Table 5, a difference between the invention batteries T8 and T10 is not substantially found with respect to the results of the storage test at 60° C. However, in the 3 It rate properties, the invention battery T10 reveals satisfactory results as compared with the invention battery T8. It is understood from this matter that when the amount of HEMA to be contained in the polymer decreases, the rate properties are enhanced. It is considered that this is a phenomenon to be caused due to affinity with the electrolytic liquid. That is, HEMA is the fundamentals of the crosslinking structure, and the crosslinking amount is determined by its amount. As described previously, when the crosslinking amount is high, the affinity with the electrolytic liquid is lowered, and therefore, the ionic conductivity is lowered with a ratio of the electrolytic liquid to be contained in a gel. For that reason, it is preferable that the content of HEMA in the polymer is not more than 6.0% by weight. On the other hand, when the degree of crosslinking is low, though the affinity with the electrolytic liquid is enhanced, the polymer is easy to elute into the electrolytic liquid, thereby causing a possibility that an appropriate and effective additive layer cannot be stably formed in the vicinity of the particle. For that reason, it is considered that the effect for improving storage properties is lowered. Accordingly, it is preferable that the content of HEMA in the polymer is 0.1% by weight or more.

Therefore, taking into consideration the improvement of storage performance and rate properties, the amount of HEMA to be contained in the polymer is preferably in the range of from 0.1 to 6.0% by weight, and more preferably in the range of from 0.1 to 1.5% by weight.

<Effect as an Additive>

The effect to be brought when the polymer of the invention is used as an additive in the positive electrode active material layer is compared with the effect to be brought when it is used as a binder.

Example 11

A positive electrode was prepared in the same manner as in Example 3, except that Polymer-C (PME/HEMA/St: 78.9/

5.7/15.4 (wt %)) was added in an amount of 0.5% by weight, and a battery was prepared using this positive electrode. This battery was designated as "invention battery T11".

Comparative Example 4

PVDF and Polymer-C were previously kneaded in a solids ratio of 80/20 (% by weight), and lithium cobalt oxide and acetylene black were mixed therewith in a weight ratio of lithium cobalt oxide to acetylene to (PVDF+Polymer-C) of 95/2.5/2.5 (PVDF/Polymer-C, 2.0/0.5) to prepare a slurry. A positive electrode was prepared using this slurry. Using this positive electrode, a battery was prepared in the manner as in Example 3. This battery was designated as "comparative battery R4".

With respect to the invention battery T11 and the comparative battery R4, the storage test at 60° C. was carried out, and the obtained results are shown in Table 6. Also, an increase in the thickness of the battery after the storage test was measured, and the obtained results are shown in Table 6.

TABLE 6

|  | Increase in Thickness of Battery after Storage Test at 60° C. (mm) | Results of Storage Test at 60° C. | |
| --- | --- | --- | --- |
|  |  | Residual Capacity (%) | Reversible Capacity (%) |
| Invention Battery T11 | 0.389 | 68.9 | 84.9 |
| Comparative Battery R4 | 0.817 | 68.4 | 81.1 |

As shown in Table 6, with respect to the residual capacity and reversible capacity in the results of storage test at 60° C., there was not found a significant difference between the invention battery T11 and the comparative battery R4. However, with respect to the increase in the thickness of the battery after the storage test at 60° C., the comparative battery R4 was found to be larger than the invention battery T11. Accordingly, it was confirmed that the invention battery T11 was smaller in the generation of a gas in the high-temperature storage test than the comparative battery R4.

It is considered that this is because in the comparative battery R4 in which the binder and the polymer of the invention are added in a mixed state, the polymer of the invention comes into contact with the positive electrode active material, and this polymer is decomposed at the time of the high-temperature storage test, whereby a gas is generated. On the other hand, it is considered that in the invention battery T11, since the polymer of the invention is added in the slurry containing the positive electrode active material and the binder, the polymer of the invention is aligned in the surroundings of the binder for coating the positive electrode active material and hardly comes into contact with the positive electrode active material, thereby generating no gas.

It has been confirmed from the foregoing matters that in case of using the polymer of the invention as a binder, the battery properties are adversely affected.

What is claimed is:

1. A positive electrode for non-aqueous electrolyte battery comprising a positive electrode active material layer containing at least a positive electrode active material, a binder and a polymer, wherein the content of the polymer in the positive electrode active material layer is in the range of from 0.01 to 0.5% by weight; and the polymer has a block chain A composed of a random copolymer containing a repeating unit (I) represented by the following formula (I) and a repeating unit (II) represented by the following formula (II) and a block chain B containing a repeating unit (III) represented by the following formula (III):

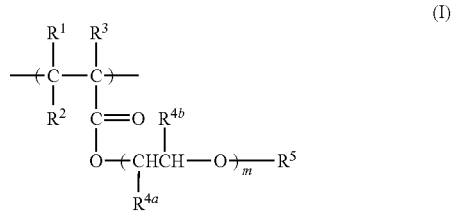

wherein $R^1$, $R^2$ and $R^3$ each independently represents a hydrogen atom or a hydrocarbon group having from 1 to 10 carbon atoms; $R^1$ and $R^3$ may be joined together to form a ring; $R^{4a}$ and $R^{4b}$ each independently represents a hydrogen atom or a methyl group; $R^5$ represents a hydrogen atom, a hydrocarbon group, an acyl group or a silyl group; represents an integer of from 1 to 100; and when m is 2 or more, $R^{4a}$s and $R^{4b}$s may be the same or different, respectively,

wherein $R^6$ and $R^8$ each independently represents a hydrogen atom or a hydrocarbon group having from 1 to 10 carbon atoms; $R^6$ and $R^8$ may be joined together to form a ring; $R^7$ represents a hydrogen atom, a hydrocarbon group having from 1 to 10 carbon atoms, a hydroxyl group, a hydrocarbon oxy group, a carboxyl group, an acid anhydride group, an amino group, an ester group, or an organic group having at least one functional group selected from the group consisting of a hydroxyl group, a carboxyl group, an epoxy group, an acid anhydride group and an amino group; and R9 represents an organic group having at least one functional group selected from the group consisting of a hydroxyl group, a carboxyl group, an epoxy group, an acid anhydride group and an amino group, and

wherein $R^{10}$, $R^{11}$ and $R^{12}$ each independently represents a hydrogen atom or a hydrocarbon group having from 1 to i0 carbon atoms; and $R^{13}$ represents an aryl group or a heteroaryl group.

2. The positive electrode for non-aqueous electrolyte battery according to claim 1, wherein said positive electrode active material is coated with said binder and said polymer is disposed in the surroundings of the binder for coating the positive electrode active material.

3. The positive electrode for non-aqueous electrolyte battery according to claim 2, wherein the positive electrode active material layer is formed by coating a slurry prepared by adding the polymer to a slurry containing the positive electrode active material and the binder.

4. The positive electrode for non-aqueous electrolyte battery according to claim 1, wherein a degree of polymerization of the repeating unit (I) is 5 or more.

5. The positive electrode for non-aqueous electrolyte battery according to claim 1, wherein a degree of polymerization of the repeating unit (II) is 5 or more.

6. The positive electrode for non-aqueous electrolyte battery according to claim 1, wherein the block chain A is composed of a random copolymer in which a proportion of the repeating unit (I) in the block chain A is in the range of from 90 to 99.9% by weight; and a proportion of the repeating unit (II) is in the range of from 10 to 0.1% by weight.

7. The positive electrode for non-aqueous electrolyte battery according to claim 1, wherein a proportion of the total sum of the repeating units (I) and (II) relative to the total sum of the repeating units (I), (II) and (III) is in the range of from 50 to 90% by weight; and a proportion of the repeating unit (III) is in the range of from 50 to 10% by weight.

8. The positive electrode for non-aqueous electrolyte battery according to claim 1, wherein in the repeating unit (I), a repeating unit segment represented by the following formula (IV) accounts for from 60 to 85% by weight;

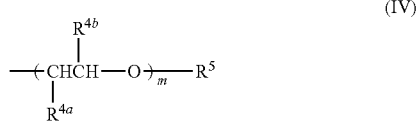

(IV)

wherein $R^{4a}$ and $R^{4b}$ each independently represents a hydrogen atom or a methyl group.

9. The positive electrode for non-aqueous electrolyte battery according to claim 1, wherein the repeating unit (II) is a repeating unit in which a (meth)acrylate having a hydroxyl group of the ester moiety is derived as a monomer.

10. The positive electrode for non-aqueous electrolyte battery according to claim 1, wherein the repeating unit (II) is contained in an amount in the range of from 0.1 to 12.0% by weight in the polymer.

11. The positive electrode for non-aqueous electrolyte battery according to claim 1, wherein the polymer is a block polymer in which the block chain B, the block chain A and the block chain B are bound in this order.

12. The positive electrode for non-aqueous electrolyte battery according to claim 11, wherein the polymer has a number average molecular weight in the range of from 50,000 to 500,000.

13. The positive electrode for non-aqueous electrolyte battery according to claim 12, wherein a ratio (Mw/Mn) of a weight average molecular weight (Mw) to a number average molecular weight (Mn) of the polymer is in the range of from 1.001 to 2.50.

14. The positive electrode for non-aqueous electrolyte battery according to claim 1, wherein the polymer is a star polymer having a core part and an arm part composed of a polymer chain containing the block chain A and the block chain B.

15. The positive electrode for non-aqueous electrolyte battery according to claim 14, wherein the polymer is a star polymer having a core part having one or more aromatic rings and an arm part composed of a polymer chain in which the block chain B and the block chain A are aligned in this order from the core part.

16. The positive electrode for non aqueous electrolyte battery according to claim 14, wherein the star polymer is a star polymer composed of a polymer chain having two or more functional groups on an end thereof.

17. The positive electrode for non-aqueous electrolyte battery according to claim 16, wherein the block chain A is formed upon being further extended from two or more functional groups of the end of the block chain B of the arm part.

18. The positive electrode for non-aqueous electrolyte battery according to claim 17, wherein the functional group is a functional group capable of being converted to a hydroxyl group-containing group or a functional group capable of being converted to an active halogen-containing group.

19. The positive electrode for non-aqueous electrolyte battery according to claim 14, wherein the core part has a skeleton structure represented by the following formula (V):

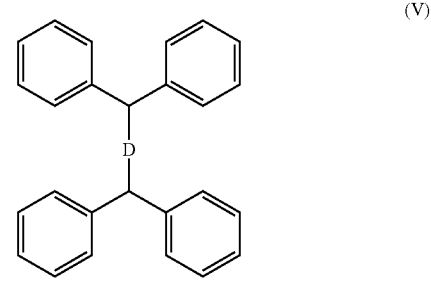

(V)

wherein D represents $(CH_2)_q$ or a p-phenylene group; and q represents an integer of from 0 to 3.

20. The positive electrode for non-aqueous electrolyte battery according to claim 14, wherein the star polymer has a number average molecular weight in the range of from 50,000 to 1,000,000.

21. The positive electrode for non-aqueous electrolyte battery according to claim 14, wherein a ratio (Mw/Mn) of a weight average molecular weight (Mw) to a number average molecular weight (Mn) of the star polymer is in the range of from 1.001 to 2.50.

22. The positive electrode for non-aqueous electrolyte battery according to claim 1, wherein the polymer is a crosslinked polymer obtained by allowing a block polymer in which the block chain B and the block chain A are aligned in this order or a star polymer having, as an arm part, a polymer chain in which the block chain B and the block chain A are aligned in this order from the core part to react with a crosslinking agent.

23. The positive electrode for non-aqueous electrolyte battery according to claim 22, wherein the crosslinking agent is a polyisocyanate compound having two or more isocyanate groups in the molecule thereof.

24. The positive electrode for non-aqueous electrolyte battery according to claim 22, wherein the crosslinked polymer is obtained by allowing from 0.1 to 2 moles of the crosslinking agent to react per mole the repeating unit (II) in the block polymer.

* * * * *